United States Patent
Richards et al.

(10) Patent No.: US 10,311,081 B2
(45) Date of Patent: Jun. 4, 2019

(54) SYSTEM AND METHOD FOR SHARING INVESTIGATION RESULTS

(71) Applicant: Palantir Technologies, Inc., Palo Alto, CA (US)

(72) Inventors: Kevin Richards, Menlo Park, CA (US); David Cohen, Palo Alto, CA (US); Khan Tasinga, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 139 days.

(21) Appl. No.: 15/356,482

(22) Filed: Nov. 18, 2016

(65) Prior Publication Data

US 2017/0068716 A1   Mar. 9, 2017

Related U.S. Application Data

(63) Continuation of application No. 13/669,274, filed on Nov. 5, 2012, now Pat. No. 9,501,761.

(51) Int. Cl.
*G06F 16/26* (2019.01)
*G06F 16/248* (2019.01)
(Continued)

(52) U.S. Cl.
CPC ............ *G06F 16/26* (2019.01); *G06F 16/248* (2019.01); *G06F 16/9024* (2019.01);
(Continued)

(58) Field of Classification Search
CPC .......... H04N 5/44543; H04N 21/4622; H04N 21/47; G11B 27/34; G11B 27/034
See application file for complete search history.

(56) References Cited

U.S. PATENT DOCUMENTS 4,881,179 A   11/1989   Vincent
5,241,625 A   8/1993   Epard et al.
(Continued)

FOREIGN PATENT DOCUMENTS

AU   2011279270   9/2015
AU   2013251186   11/2015
(Continued)

OTHER PUBLICATIONS

Official Communication for European Patent Application No. 14159629.6 dated Jul. 31, 2014.
(Continued)

*Primary Examiner* — Mandrita Brahmachari
(74) *Attorney, Agent, or Firm* — Hickman Palermo Becker Bingham LLP

(57) ABSTRACT

A computer-based investigative analysis system is disclosed in which a user can share results of an investigation with other users in a way that allows the sharing user to visualize how the results will be shared before they are shared. The results are shared in the form of a visual graph having nodes, edges, and other presentation elements. The nodes represent data objects that are the subject of the investigation and the edges represent connections between the data objects. The graph is shared in the form of an automatically generated redacted graph omitting nodes, edges, and presentation elements for which the other users do not have permission to view. Before sharing the graph, the sharing user is presented with a visualization of the automatically generated redacted graph providing the user an opportunity to confirm that sharing the redacted graph will not constitute an unauthorized information leakage.

20 Claims, 10 Drawing Sheets

(51) Int. Cl.
*G06F 16/901* (2019.01)
*G06F 21/62* (2013.01)
*G06Q 10/10* (2012.01)
*H04L 29/06* (2006.01)
*G06F 21/84* (2013.01)
*G06Q 50/26* (2012.01)

(52) U.S. Cl.
CPC ...... *G06F 21/6218* (2013.01); *G06F 21/6254* (2013.01); *G06Q 10/10* (2013.01); *H04L 63/101* (2013.01); *G06F 21/84* (2013.01); *G06Q 50/265* (2013.01)

(56) References Cited

U.S. PATENT DOCUMENTS

| | | |
|---|---|---|
| 5,548,749 A | 8/1996 | Kroenke et al. |
| 5,708,828 A | 1/1998 | Coleman |
| 5,765,171 A | 6/1998 | Gehani et al. |
| 5,774,717 A | 6/1998 | Porcaro |
| 5,806,074 A | 9/1998 | Souder et al. |
| 5,845,300 A | 12/1998 | Comer |
| 5,870,761 A | 2/1999 | Demers et al. |
| 5,943,676 A | 8/1999 | Boothby |
| 5,978,475 A | 11/1999 | Schneier et al. |
| 5,999,911 A | 12/1999 | Berg et al. |
| 6,065,026 A | 5/2000 | Cornelia et al. |
| 6,098,078 A | 8/2000 | Gehani et al. |
| 6,101,479 A | 8/2000 | Shaw |
| 6,190,053 B1 | 2/2001 | Stahlecker et al. |
| 6,202,085 B1 | 3/2001 | Benson et al. |
| 6,216,140 B1 | 4/2001 | Kramer |
| 6,232,971 B1 | 5/2001 | Haynes |
| 6,237,138 B1 | 5/2001 | Hameluck et al. |
| 6,240,414 B1 | 5/2001 | Beizer et al. |
| 6,243,706 B1 | 6/2001 | Moreau et al. |
| 6,279,018 B1 | 8/2001 | Kudrolli et al. |
| 6,289,338 B1 | 9/2001 | Stoffel et al. |
| 6,317,754 B1 | 11/2001 | Peng |
| 6,370,538 B1 | 4/2002 | Lamping et al. |
| 6,374,252 B1 | 4/2002 | Althoff et al. |
| 6,430,305 B1 | 8/2002 | Decker |
| 6,463,404 B1 | 10/2002 | Appleby |
| 6,523,019 B1 | 2/2003 | Borthwick |
| 6,523,172 B1 | 2/2003 | Martinez-Guerra et al. |
| 6,539,381 B1 | 3/2003 | Prasad et al. |
| 6,539,538 B1 | 3/2003 | Brewster et al. |
| 6,560,620 B1 | 5/2003 | Ching |
| 6,640,231 B1 | 10/2003 | Andersen et al. |
| 6,642,945 B1 | 11/2003 | Sharpe |
| 6,665,683 B1 | 12/2003 | Meltzer |
| 6,725,240 B1 | 4/2004 | Asad et al. |
| 6,748,481 B1 | 6/2004 | Parry et al. |
| 6,807,569 B1 | 10/2004 | Bhimani et al. |
| 6,816,941 B1 | 11/2004 | Carlson et al. |
| 6,850,317 B2 | 2/2005 | Mullins et al. |
| 6,877,137 B1 | 4/2005 | Rivette et al. |
| 6,944,777 B1 | 9/2005 | Belani et al. |
| 6,944,821 B1 | 9/2005 | Bates et al. |
| 6,967,589 B1 | 11/2005 | Peters |
| 6,978,419 B1 | 12/2005 | Kantrowitz |
| 7,017,046 B2 | 3/2006 | Doyle et al. |
| 7,027,974 B1 | 4/2006 | Busch et al. |
| 7,072,911 B1 | 7/2006 | Doman |
| 7,086,028 B1 | 8/2006 | Davis et al. |
| 7,089,541 B2 | 8/2006 | Ungar |
| 7,167,877 B2 | 1/2007 | Balogh et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,225,468 B2 | 5/2007 | Waisman et al. |
| 7,237,192 B1 | 6/2007 | Stephenson et al. |
| 7,240,330 B2 | 7/2007 | Fairweather |
| 7,302,708 B2 | 11/2007 | Kovarik |
| 7,392,254 B1 | 6/2008 | Jenkins |
| 7,437,664 B2 | 10/2008 | Borson |
| 7,441,182 B2 | 10/2008 | Beilinson et al. |
| 7,441,219 B2 | 10/2008 | Perry et al. |
| 7,523,146 B2 | 4/2009 | Holt et al. |
| 7,530,105 B2 | 5/2009 | Gilbert et al. |
| 7,533,069 B2 | 5/2009 | Fairweather |
| 7,596,285 B2 | 9/2009 | Brown et al. |
| 7,627,812 B2 | 12/2009 | Chamberlain et al. |
| 7,634,717 B2 | 12/2009 | Chamberlain et al. |
| 7,664,829 B2 | 2/2010 | Yamamoto et al. |
| 7,676,788 B1 | 3/2010 | Ousterhout et al. |
| 7,685,083 B2 | 3/2010 | Fairweather |
| 7,707,178 B2 | 4/2010 | Prahlad et al. |
| 7,716,140 B1 | 5/2010 | Nielsen et al. |
| 7,730,396 B2 | 6/2010 | Chidlovskii et al. |
| 7,765,489 B1 | 7/2010 | Shah |
| 7,770,032 B2 | 8/2010 | Nesta et al. |
| 7,770,100 B2 | 8/2010 | Chamberlain et al. |
| 7,801,871 B2 | 9/2010 | Gosnell |
| 7,805,408 B2 | 9/2010 | Padgett et al. |
| 7,818,297 B2 | 10/2010 | Peleg et al. |
| 7,877,421 B2 | 1/2011 | Berger et al. |
| 7,880,921 B2 | 2/2011 | Dattilo et al. |
| 7,941,336 B1 | 5/2011 | Robin-Jan |
| 7,953,710 B2 | 5/2011 | Novik et al. |
| 7,958,147 B1 | 6/2011 | Turner et al. |
| 7,962,495 B2 | 6/2011 | Jain et al. |
| 7,962,848 B2 | 6/2011 | Bertram |
| 7,966,199 B1 | 6/2011 | Frasher |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,015,151 B2 | 9/2011 | Lier et al. |
| 8,073,857 B2 | 12/2011 | Sreekanth |
| 8,117,022 B2 | 2/2012 | Linker |
| 8,132,149 B2 | 3/2012 | Shenfield et al. |
| 8,190,893 B2 | 5/2012 | Benson et al. |
| 8,191,005 B2 | 5/2012 | Baier et al. |
| 8,196,184 B2 | 6/2012 | Amirov et al. |
| 8,225,201 B2 | 7/2012 | Michael |
| 8,239,668 B1 | 8/2012 | Chen et al. |
| 8,271,948 B2 | 9/2012 | Talozi et al. |
| 8,290,838 B1 | 10/2012 | Thakur et al. |
| 8,290,990 B2 | 10/2012 | Drath et al. |
| 8,301,904 B1 | 10/2012 | Gryaznov |
| 8,302,855 B2 | 11/2012 | Ma et al. |
| 8,312,367 B2 | 11/2012 | Foster |
| 8,312,546 B2 | 11/2012 | Alme |
| 8,316,060 B1 | 11/2012 | Snyder et al. |
| 8,380,659 B2 | 2/2013 | Zunger |
| 8,392,556 B2 | 3/2013 | Goulet et al. |
| 8,442,940 B1 | 5/2013 | Faletti et al. |
| 8,489,623 B2 | 7/2013 | Jain et al. |
| 8,515,912 B2 | 8/2013 | Garrod et al. |
| 8,527,461 B2 | 9/2013 | Ducott, III et al. |
| 8,527,949 B1 | 9/2013 | Pleis et al. |
| 8,560,494 B1 | 10/2013 | Downing |
| 8,620,641 B2 | 12/2013 | Farnsworth et al. |
| 8,646,080 B2 | 2/2014 | Williamson et al. |
| 8,682,696 B1 | 3/2014 | Shanmugam |
| 8,688,573 B1 | 4/2014 | Ruknoic et al. |
| 8,688,749 B1 | 4/2014 | Ducott, III et al. |
| 8,689,182 B2 | 4/2014 | Leithead et al. |
| 8,726,379 B1 | 5/2014 | Stiansen et al. |
| 8,732,574 B2 | 5/2014 | Burr et al. |
| 8,782,004 B2 | 7/2014 | Ducott, III et al. |
| 8,799,313 B2 | 8/2014 | Satlow |
| 8,807,948 B2 | 8/2014 | Luo et al. |
| 8,838,538 B1 | 9/2014 | Landau et al. |
| 8,886,601 B1 | 11/2014 | Landau et al. |
| 8,903,717 B2 | 12/2014 | Elliot |
| 8,930,874 B2 | 1/2015 | Duff et al. |
| 8,930,897 B2 | 1/2015 | Nassar |
| 8,938,686 B1 | 1/2015 | Erenrich et al. |
| 8,984,390 B2 | 3/2015 | Aymeloglu et al. |
| 9,009,827 B1 | 4/2015 | Albertson et al. |
| 9,021,260 B1 | 4/2015 | Falk et al. |
| 9,058,315 B2 | 6/2015 | Burr et al. |
| 9,165,100 B2 | 10/2015 | Begur et al. |

(56) References Cited

U.S. PATENT DOCUMENTS

| | | |
|---|---|---|
| 9,286,373 B2 | 3/2016 | Elliot et al. |
| 9,569,070 B1 | 2/2017 | Ma et al. |
| 2001/0021936 A1 | 9/2001 | Bertram |
| 2002/0032677 A1 | 3/2002 | Morgenthaler et al. |
| 2002/0095360 A1 | 7/2002 | Joao |
| 2002/0103705 A1 | 8/2002 | Brady |
| 2002/0112157 A1 | 8/2002 | Doyle et al. |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0055825 A1 | 3/2003 | Chen et al. |
| 2003/0061132 A1 | 3/2003 | Mason et al. |
| 2003/0084017 A1 | 5/2003 | Ordille |
| 2003/0088654 A1 | 5/2003 | Good et al. |
| 2003/0093755 A1 | 5/2003 | O'Carroll |
| 2003/0126102 A1 | 7/2003 | Borthwick |
| 2003/0172053 A1 | 9/2003 | Fairweather |
| 2003/0177112 A1 | 9/2003 | Gardner |
| 2003/0182313 A1 | 9/2003 | Federwisch et al. |
| 2004/0034570 A1 | 2/2004 | Davis |
| 2004/0044648 A1 | 3/2004 | Anfindsen et al. |
| 2004/0044992 A1 | 3/2004 | Muller et al. |
| 2004/0078451 A1 | 4/2004 | Dietz et al. |
| 2004/0083466 A1 | 4/2004 | Dapp et al. |
| 2004/0103124 A1 | 5/2004 | Kupkova |
| 2004/0103147 A1 | 5/2004 | Flesher et al. |
| 2004/0111390 A1 | 6/2004 | Saito et al. |
| 2004/0153418 A1 | 8/2004 | Hanweck |
| 2004/0205492 A1 | 10/2004 | Newsome |
| 2004/0221223 A1 | 11/2004 | Yu et al. |
| 2004/0236688 A1 | 11/2004 | Bozeman |
| 2004/0236711 A1 | 11/2004 | Nixon et al. |
| 2004/0250124 A1 | 12/2004 | Chesla et al. |
| 2004/0250576 A1 | 12/2004 | Flanders |
| 2005/0010472 A1 | 1/2005 | Quatse et al. |
| 2005/0028094 A1 | 2/2005 | Allyn |
| 2005/0034107 A1 | 2/2005 | Kendall et al. |
| 2005/0039116 A1 | 2/2005 | Slack-Smith |
| 2005/0039119 A1 | 2/2005 | Parks et al. |
| 2005/0044187 A1 | 2/2005 | Jhaveri et al. |
| 2005/0050537 A1 | 3/2005 | Thompson et al. |
| 2005/0091186 A1 | 4/2005 | Elish |
| 2005/0091420 A1 | 4/2005 | Snover et al. |
| 2005/0097061 A1 | 5/2005 | Shapiro et al. |
| 2005/0108063 A1 | 5/2005 | Madill et al. |
| 2005/0125715 A1 | 6/2005 | Franco et al. |
| 2005/0183005 A1 | 8/2005 | Denoue et al. |
| 2005/0193024 A1 | 9/2005 | Beyer et al. |
| 2005/0229256 A2 | 10/2005 | Banzhof |
| 2005/0267865 A1 | 12/2005 | Bird et al. |
| 2006/0026561 A1 | 2/2006 | Bauman et al. |
| 2006/0031779 A1 | 2/2006 | Theurer et al. |
| 2006/0036568 A1 | 2/2006 | Moore et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0069912 A1 | 3/2006 | Zheng et al. |
| 2006/0074866 A1 | 4/2006 | Chamberlain et al. |
| 2006/0080139 A1 | 4/2006 | Mainzer |
| 2006/0106879 A1 | 5/2006 | Zondervan et al. |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0155945 A1 | 7/2006 | McGarvey |
| 2006/0178915 A1 | 8/2006 | Chao |
| 2006/0190497 A1 | 8/2006 | Inturi et al. |
| 2006/0206866 A1 | 9/2006 | Eldrige et al. |
| 2006/0218637 A1 | 9/2006 | Thomas et al. |
| 2006/0224579 A1 | 10/2006 | Zheng |
| 2006/0242204 A1 | 10/2006 | Karas et al. |
| 2006/0265377 A1 | 11/2006 | Raman et al. |
| 2006/0265417 A1 | 11/2006 | Amato et al. |
| 2006/0265747 A1 | 11/2006 | Judge |
| 2006/0271526 A1 | 11/2006 | Charnock et al. |
| 2006/0277460 A1 | 12/2006 | Forstall et al. |
| 2007/0000999 A1 | 1/2007 | Kubo et al. |
| 2007/0005707 A1 | 1/2007 | Teodosiu et al. |
| 2007/0018986 A1* | 1/2007 | Hauser .............. G06T 11/206 345/440 |
| 2007/0026373 A1 | 2/2007 | Chao |
| 2007/0043686 A1 | 2/2007 | Inturi et al. |
| 2007/0061752 A1 | 3/2007 | Cory |
| 2007/0074169 A1 | 3/2007 | Chess et al. |
| 2007/0078872 A1 | 4/2007 | Cohen |
| 2007/0112714 A1 | 5/2007 | Fairweather |
| 2007/0112887 A1 | 5/2007 | Liu et al. |
| 2007/0113164 A1 | 5/2007 | Hansen et al. |
| 2007/0130217 A1 | 6/2007 | Linyard et al. |
| 2007/0136095 A1 | 6/2007 | Weinstein |
| 2007/0168516 A1 | 7/2007 | Liu et al. |
| 2007/0168871 A1 | 7/2007 | Jenkins |
| 2007/0174760 A1 | 7/2007 | Chamberlain et al. |
| 2007/0180075 A1 | 8/2007 | Chasman et al. |
| 2007/0185850 A1 | 8/2007 | Walters et al. |
| 2007/0220067 A1 | 9/2007 | Suriyanarayanan et al. |
| 2007/0220328 A1 | 9/2007 | Liu et al. |
| 2007/0233756 A1 | 10/2007 | D'Souza et al. |
| 2007/0245339 A1 | 10/2007 | Bauman et al. |
| 2007/0284433 A1 | 12/2007 | Domenica et al. |
| 2007/0294766 A1 | 12/2007 | Mir et al. |
| 2007/0299697 A1 | 12/2007 | Friedlander et al. |
| 2007/0299887 A1 | 12/2007 | Novik et al. |
| 2008/0005188 A1 | 1/2008 | Li et al. |
| 2008/0016155 A1 | 1/2008 | Khalatian |
| 2008/0027981 A1 | 1/2008 | Wahl |
| 2008/0033753 A1 | 2/2008 | Canda et al. |
| 2008/0086718 A1 | 4/2008 | Bostick et al. |
| 2008/0091693 A1 | 4/2008 | Murthy |
| 2008/0109714 A1 | 5/2008 | Kumar et al. |
| 2008/0126430 A1* | 5/2008 | Garrett .............. G06F 17/30377 |
| 2008/0140387 A1 | 6/2008 | Linker |
| 2008/0141117 A1 | 6/2008 | King et al. |
| 2008/0148398 A1 | 6/2008 | Mezack et al. |
| 2008/0168135 A1 | 7/2008 | Redlich et al. |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0189240 A1 | 8/2008 | Mullins et al. |
| 2008/0201580 A1 | 8/2008 | Savitzky et al. |
| 2008/0228467 A1 | 9/2008 | Womack et al. |
| 2008/0229422 A1 | 9/2008 | Hudis et al. |
| 2008/0235575 A1 | 9/2008 | Weiss |
| 2008/0243951 A1 | 10/2008 | Webman et al. |
| 2008/0249820 A1 | 10/2008 | Pathria |
| 2008/0276167 A1 | 11/2008 | Michael |
| 2008/0281580 A1 | 11/2008 | Zabokritski |
| 2008/0288475 A1 | 11/2008 | Kim et al. |
| 2008/0313132 A1 | 12/2008 | Hao et al. |
| 2008/0313243 A1 | 12/2008 | Poston et al. |
| 2008/0320299 A1 | 12/2008 | Wobber et al. |
| 2009/0024946 A1 | 1/2009 | Gotz |
| 2009/0024962 A1 | 1/2009 | Gotz |
| 2009/0031401 A1 | 1/2009 | Cudich et al. |
| 2009/0043801 A1 | 2/2009 | LeClair |
| 2009/0089651 A1 | 4/2009 | Herberger et al. |
| 2009/0103442 A1 | 4/2009 | Douville |
| 2009/0106178 A1 | 4/2009 | Chu |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0164934 A1 | 6/2009 | Bhattiprolu et al. |
| 2009/0172821 A1 | 7/2009 | Daira et al. |
| 2009/0177962 A1 | 7/2009 | Gusmorino et al. |
| 2009/0187546 A1 | 7/2009 | Whyte et al. |
| 2009/0199090 A1 | 8/2009 | Poston et al. |
| 2009/0199106 A1 | 8/2009 | Jonsson et al. |
| 2009/0216562 A1 | 8/2009 | Faulkner et al. |
| 2009/0228507 A1 | 9/2009 | Jain et al. |
| 2009/0228701 A1 | 9/2009 | Lin |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |

(56) References Cited

U.S. PATENT DOCUMENTS

| | | |
|---|---|---|
| 2009/0254970 A1 | 10/2009 | Agarwal et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0307049 A1 | 12/2009 | Elliott et al. |
| 2009/0313463 A1 | 12/2009 | Pang et al. |
| 2009/0319891 A1 | 12/2009 | MacKinlay |
| 2009/0328222 A1 | 12/2009 | Helman et al. |
| 2010/0004857 A1 | 1/2010 | Pereira et al. |
| 2010/0011000 A1 | 1/2010 | Chakra et al. |
| 2010/0011282 A1 | 1/2010 | Dollard et al. |
| 2010/0057622 A1 | 3/2010 | Faith et al. |
| 2010/0070842 A1 | 3/2010 | Aymeloglu et al. |
| 2010/0070844 A1 | 3/2010 | Aymeloglu et al. |
| 2010/0076813 A1 | 3/2010 | Ghosh et al. |
| 2010/0077481 A1 | 3/2010 | Polyakov et al. |
| 2010/0098318 A1 | 4/2010 | Anderson |
| 2010/0100963 A1 | 4/2010 | Mahaffey |
| 2010/0122152 A1 | 5/2010 | Chamberlain et al. |
| 2010/0145909 A1 | 6/2010 | Ngo |
| 2010/0169137 A1 | 7/2010 | Jastrebski et al. |
| 2010/0204983 A1 | 8/2010 | Chung et al. |
| 2010/0223260 A1 | 9/2010 | Wu |
| 2010/0235915 A1 | 9/2010 | Memon et al. |
| 2010/0238174 A1 | 9/2010 | Haub et al. |
| 2010/0262688 A1 | 10/2010 | Hussain et al. |
| 2010/0262901 A1 | 10/2010 | DiSalvo |
| 2010/0280851 A1 | 11/2010 | Merkin |
| 2010/0306285 A1 | 12/2010 | Shah et al. |
| 2010/0306722 A1 | 12/2010 | LeHoty et al. |
| 2010/0313119 A1 | 12/2010 | Baldwin et al. |
| 2010/0313239 A1 | 12/2010 | Chakra et al. |
| 2010/0330801 A1 | 12/2010 | Rouh |
| 2011/0010342 A1 | 1/2011 | Chen et al. |
| 2011/0047540 A1 | 2/2011 | Williams et al. |
| 2011/0060910 A1 | 3/2011 | Gormish et al. |
| 2011/0074788 A1 | 3/2011 | Regan et al. |
| 2011/0093327 A1 | 4/2011 | Fordyce et al. |
| 2011/0099133 A1 | 4/2011 | Chang et al. |
| 2011/0107196 A1 | 5/2011 | Foster |
| 2011/0145187 A1 | 6/2011 | Himmelsbach et al. |
| 2011/0161409 A1 | 6/2011 | Nair |
| 2011/0173093 A1 | 7/2011 | Psota et al. |
| 2011/0179048 A1 | 7/2011 | Satlow |
| 2011/0208565 A1 | 8/2011 | Ross et al. |
| 2011/0219450 A1 | 9/2011 | McDougal et al. |
| 2011/0225482 A1 | 9/2011 | Chan et al. |
| 2011/0246229 A1 | 10/2011 | Pacha |
| 2011/0258216 A1 | 10/2011 | Supakkul et al. |
| 2012/0004894 A1 | 1/2012 | Butler |
| 2012/0005159 A1 | 1/2012 | Wang et al. |
| 2012/0016849 A1 | 1/2012 | Garrod et al. |
| 2012/0022945 A1 | 1/2012 | Falkenborg et al. |
| 2012/0023075 A1 | 1/2012 | Pulfer et al. |
| 2012/0036106 A1 | 2/2012 | Desai et al. |
| 2012/0059853 A1 | 3/2012 | Jagota |
| 2012/0065987 A1 | 3/2012 | Farooq et al. |
| 2012/0084117 A1 | 4/2012 | Tavares et al. |
| 2012/0084184 A1 | 4/2012 | Raleigh |
| 2012/0110633 A1 | 5/2012 | An et al. |
| 2012/0110674 A1 | 5/2012 | Belani et al. |
| 2012/0136839 A1 | 5/2012 | Eberlein et al. |
| 2012/0188252 A1 | 7/2012 | Law |
| 2012/0191446 A1 | 7/2012 | Binsztok et al. |
| 2012/0197657 A1 | 8/2012 | Prodanovic |
| 2012/0197660 A1 | 8/2012 | Prodanovic |
| 2012/0210294 A1 | 8/2012 | Gores |
| 2012/0215784 A1 | 8/2012 | King et al. |
| 2012/0221553 A1 | 8/2012 | Wittmer et al. |
| 2012/0226590 A1 | 9/2012 | Love et al. |
| 2012/0254129 A1 | 10/2012 | Wheeler et al. |
| 2012/0266245 A1 | 10/2012 | McDougal et al. |
| 2012/0284670 A1 | 11/2012 | Kashik et al. |
| 2012/0304150 A1 | 11/2012 | Leithead et al. |
| 2012/0304244 A1 | 11/2012 | Xie et al. |
| 2012/0323829 A1 | 12/2012 | Stokes et al. |
| 2013/0006655 A1 | 1/2013 | Van Arkel et al. |
| 2013/0006668 A1 | 1/2013 | Van Arkel et al. |
| 2013/0016106 A1 | 1/2013 | Yip et al. |
| 2013/0067017 A1 | 3/2013 | Carriere et al. |
| 2013/0086482 A1 | 4/2013 | Parsons |
| 2013/0091084 A1 | 4/2013 | Lee |
| 2013/0097482 A1 | 4/2013 | Marantz et al. |
| 2013/0124193 A1 | 5/2013 | Holmberg |
| 2013/0124567 A1 | 5/2013 | Balinsky et al. |
| 2013/0139268 A1 | 5/2013 | An et al. |
| 2013/0145478 A1* | 6/2013 | O'Gorman, Jr. ........ G06F 21/10 726/27 |
| 2013/0151305 A1 | 6/2013 | Akinola et al. |
| 2013/0151453 A1 | 6/2013 | Bhanot et al. |
| 2013/0166480 A1 | 6/2013 | Popescu et al. |
| 2013/0173540 A1 | 7/2013 | Qian et al. |
| 2013/0191336 A1 | 7/2013 | Ducott et al. |
| 2013/0191338 A1 | 7/2013 | Ducott, III et al. |
| 2013/0251233 A1 | 9/2013 | Yang et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0275446 A1 | 10/2013 | Jain et al. |
| 2013/0276799 A1 | 10/2013 | Davidson |
| 2013/0288719 A1 | 10/2013 | Alonzo |
| 2013/0346444 A1 | 12/2013 | Makkar et al. |
| 2014/0040182 A1 | 2/2014 | Gilder et al. |
| 2014/0040714 A1 | 2/2014 | Siegel et al. |
| 2014/0059683 A1 | 2/2014 | Ashley |
| 2014/0081652 A1 | 3/2014 | Klindworth |
| 2014/0089339 A1 | 3/2014 | Siddiqui et al. |
| 2014/0114972 A1 | 4/2014 | Ducott et al. |
| 2014/0123279 A1 | 5/2014 | Bishop et al. |
| 2014/0129518 A1 | 5/2014 | Ducott et al. |
| 2014/0129936 A1 | 5/2014 | Richards et al. |
| 2014/0143009 A1 | 5/2014 | Brice et al. |
| 2014/0149130 A1 | 5/2014 | Getchius |
| 2014/0208281 A1 | 7/2014 | Ming |
| 2014/0222793 A1 | 8/2014 | Sadkin et al. |
| 2014/0244284 A1 | 8/2014 | Smith |
| 2014/0358829 A1 | 12/2014 | Hurwitz |
| 2014/0366132 A1 | 12/2014 | Stiansen et al. |
| 2015/0026622 A1 | 1/2015 | Roaldson et al. |
| 2015/0046481 A1 | 2/2015 | Elliot |
| 2015/0073954 A1 | 3/2015 | Braff |
| 2015/0074050 A1 | 3/2015 | Landau et al. |
| 2015/0089353 A1 | 3/2015 | Folkening |
| 2015/0100559 A1 | 4/2015 | Nassar |
| 2015/0100907 A1 | 4/2015 | Erenrich et al. |
| 2015/0106379 A1 | 4/2015 | Elliot et al. |
| 2015/0142766 A1 | 5/2015 | Jain et al. |
| 2015/0186483 A1 | 7/2015 | Tappan et al. |
| 2015/0212663 A1 | 7/2015 | Papale et al. |
| 2015/0235334 A1 | 8/2015 | Wang et al. |
| 2015/0254220 A1 | 9/2015 | Burr et al. |
| 2015/0261847 A1 | 9/2015 | Ducott et al. |
| 2016/0019252 A1 | 1/2016 | Ducott et al. |
| 2016/0062555 A1 | 3/2016 | Ward et al. |
| 2016/0098176 A1 | 4/2016 | Cervelli et al. |
| 2016/0110369 A1 | 4/2016 | Cervelli et al. |
| 2016/0162519 A1 | 6/2016 | Stowe et al. |

FOREIGN PATENT DOCUMENTS

| | | |
|---|---|---|
| CA | 2666364 | 1/2015 |
| CN | 101729531 | 6/2010 |
| CN | 103281301 | 9/2013 |
| CN | 102054015 | 5/2014 |
| DE | 102014204840 | 9/2014 |
| DE | 102014215621 | 2/2015 |
| EP | 0 816 968 | 1/1996 |
| EP | 1647908 | 4/2006 |
| EP | 1 672 527 | 6/2006 |
| EP | 2778913 | 9/2014 |
| EP | 2778914 | 9/2014 |
| EP | 2778986 | 9/2014 |
| EP | 2911078 | 8/2015 |

(56) References Cited

FOREIGN PATENT DOCUMENTS

| | | |
|---|---|---|
| EP | 2993595 | 3/2016 |
| EP | 3002691 | 4/2016 |
| EP | 3009943 | 4/2016 |
| EP | 3032441 | 6/2016 |
| GB | 2366498 | 3/2002 |
| GB | 2513007 | 10/2014 |
| GB | 2518745 | 4/2015 |
| NL | 2013306 | 2/2015 |
| WO | WO 01/025906 | 4/2001 |
| WO | WO 2001/088750 | 11/2001 |
| WO | WO 2003/060751 | 7/2003 |
| WO | WO 2007/133206 | 11/2007 |
| WO | WO 2008/064207 | 5/2008 |
| WO | WO 2008/113059 | 9/2008 |
| WO | WO 2010/030913 | 3/2010 |
| WO | WO 2010/030914 | 3/2010 |
| WO | WO 2011/071833 | 6/2011 |
| WO | WO 2011/161565 | 12/2011 |
| WO | WO 2012/009397 | 1/2012 |
| WO | WO 2012/119008 | 9/2012 |

OTHER PUBLICATIONS

"A Tour of Pinboard," <http://pinboard.in/tour> as printed May 15, 2014 in 6 pages.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Official Communication for European Patent Application No. 14159175.0 dated Feb. 4, 2016.
Official Communication for New Zealand Patent Application No. 622484 dated Apr. 2, 2014.
Official Communication for New Zealand Patent Application No. 622414 dated Mar. 24, 2014.
Abbey, Kristen, "Review of Google Docs," May 1, 2007, pp. 2.
Klemmer et al., "Where Do Web Sites Come From? Capturing and Interacting with Design History," Association for Computing Machinery, CHI 2002, Apr. 20-25, 2002, Minneapolis, MN, pp. 8.
Altmanninger et al., "A Categorization for Conflicts in Model Versioning," Elektrotechnik & Informationstechnik (2011), 128/11-12: 421-426.
Official Communication for European Patent Application No. 15190307.7 dated Feb. 19, 2016.
Official Communication for European Patent Application No. 15188106.7 dated Feb. 3, 2016.
Official Communication for Australian Patent Application No. 2014201506 dated Feb. 27, 2015.
Palantir, "Extracting and Transforming Data with Kite," Palantir Technologies, Inc., Copyright 2010, pp. 38.
Dou et al., "Ontology Translaation on the Semantic Web 2005," Springer-Verlag, Journal on Data Semantics II Lecture Notes in Computer Science, vol. 3350, pp. 35-37.
Official Communication for Netherlands Patent Application No. 2012438 dated Sep. 21, 2015.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
"GrabUp—What a Timesaver!" <http://atlchris.com/191/grabup/>, Aug. 11, 2008, pp. 3.
Palermo, Christopher J., "Memorandum," [Disclosure relating to U.S. Appl. No. 13/916,447, filed Jun. 12, 2013, and related applications], Jan. 31, 2014 in 3 pages.
Microsoft, "Registering an Application to a URI Scheme," <http://msdn.microsoft.com/en-us/library/aa767914.aspx>, printed Apr. 4, 2009 in 4 pages.
Official Communication for New Zealand Patent Application No. 622497 dated Jun. 19, 2014.
Delicious, <http://delicious.com/> as printed May 15, 2014 in 1 page.
Kwout, <http://web.archive.org/web/20080905132448/http://www.kwout.com/> Sep. 5, 2008, pp. 2.
Schroder, Stan, "15 Ways to Create Website Screenshots," <http://mashable.com/2007/08/24/web-screenshots/>, Aug. 24, 2007, pp. 2.
Glaab et al., "EnrichNet: Network-Based Gene Set Enrichment Analysis," Bioinformatics 28.18 (2012): pp. i451-i457.
Official Communication for New Zealand Patent Application No. 622404 dated Mar. 20, 2014.
Official Communication for Canadian Patent Application No. 2806954 dated Jan. 15, 2016.
Conner, Nancy, "Google Apps: The Missing Manual," May 1, 2008, pp. 15.
FireEye, <http://www.fireeye.com/> Printed Jun. 30, 2014 in 2 pages.
Official Communication for New Zealand Patent Application No. 622473 dated Jun. 19, 2014.
Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.
Baker et al., "The Development of a Common Enumeration of Vulnerabilities and Exposures," Presented at the Second International Workshop on Recent Advances in Intrusion Detection, Sep. 7-9, 1999, pp. 35.
Official Communication for European Patent Application No. 15156004.2 dated Aug. 24, 2015.
Johnson, Maggie, "Introduction to YACC and Bison".
Microsoft Windows, "Microsoft Windows Version 2002 Print Out 2," 2002, pp. 1-6.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
SnagIt, "SnagIt 8.1.0 Print Out," Software release date Jun. 15, 2006, pp. 6.
Gu et al., "Record Linkage: Current Practice and Future Directions," Jan. 15, 2004, pp. 32.
Palantir, "Kite," https://docs.palantir.com/gotham/3.11.1.0/adminreference/datasources.11 printed Aug. 30, 2013 in 2 pages.
Official Communication for Netherlands Patent Application No. 2011729 dated Aug. 13, 2015.
Official Communication for Great Britain Patent Application No. 1413935.6 dated Jan. 27, 2015.
Wang et al., "Research on a Clustering Data De-Duplication Mechanism Based on Bloom Filter," IEEE 2010, 5 pages.
Dell Latitude D600 2003, Dell Inc., http://www.dell.com/downloads/global/products/latit/en/spec_latit_d600_en.pdf.
Hur et al., "SciMiner: web-based literature mining tool for target identification and functional enrichment analysis," Bioinformatics 25.6 (2009): pp. 838-840.
O'Sullivan, Bryan, "Making Sense of Revision Control Systems," Communications of the ACM, Sep. 2009, vol. 52, No. 9, pp. 57-62.
Nitro, "Trick: How to Capture a Screenshot as PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Nivas, Tuli, "Test Harness and Script Design Principles for Automated Testing of non-GUI or Web Based Applications," Performance Lab, Jun. 2011, pp. 30-37.
Owl Web Ontology Language Reference Feb. 4, W3C, http://www.w3.org/TR/owl-ref/.
Official Communication for Israel Patent Application No. 198253 dated Nov. 24, 2014.
Hua et al., "A Multi-attribute Data Structure with Parallel Bloom Filters for Network Services", HiPC 2006, LNCS 4297, pp. 277-288, 2006.
Lee et al., "A Data Mining and CIDF Based Approach for Detecting Novel and Distributed Intrusions," Lecture Notes in Computer Science, vol. 1907 Nov. 11, 2000, pp. 49-65.
Morrison et al., "Converting Users to Testers: An Alternative Approach to Load Test Script Creation, Parameterization and Data Corellation," CCSC: Southeastern Conference, JCSC 28, Dec. 2, 2012, pp. 188-196.

(56) References Cited

OTHER PUBLICATIONS

Waters et al., "Building an Encrypted and Searchable Audit Log," Published Jan. 9, 2004, 11 pages, http://www.parc.com/content/attachments/building_encrypted_searchable_5059_parc.pdf.
Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.
Holliday, JoAnne, "Replicated Database Recovery using Multicast Communication," IEEE 2002, pp. 11.
Official Communication for European Patent Application No. 12181585.6 dated Sep. 4, 2015.
Galliford, Miles, "SnagIt Versus Free Screen Capture Software: Critical Tools for Website Owners," <http://www.subhub.com/articles/free-screen-capture-software>, Mar. 27, 2008, pp. 11.
Crosby et al., "Efficient Data Structures for Tamper-Evident Logging," Department of Computer Science, Rice University, 2009, pp. 17.
Ferreira et al., "A Scheme for Analyzing Electronic Payment Systems," Basil 1997.
Online Tech Tips, "Clip2Net—Share files, folders and screenshots easily," <http://www.online-tech-tips.com/free-software-downloads/share-files-folders-screenshots/>, Apr. 2, 2008, pp. 5.
Official Communication for Australian Patent Application No. 2014201507 dated Feb. 27, 2015.
FireEye—Products and Solutions Overview, <http://www.fireeye.com/products-and-solutions> Printed Jun. 30, 2014 in 3 pages.
Official Communication for Netherlands Patent Application No. 2013306 dated Apr. 24, 2015.
VirusTotal—About, <http://www.virustotal.com/en/about/> Printed Jun. 30, 2014 in 8 pages.
Palantir, "Kite Data-Integration Process Overview," Palantir Technologies, Inc., Copyright 2010, pp. 48.
Official Communication for European Patent Application No. 14158958.0 dated Apr. 16, 2015.
Fidge, Colin J., "Timestamps in Message-Passing Systems," K. Raymond (Ed.) Proc. of the 11th Australian Computer Science Conference (ACSC 1988), pp. 56-66.
Chaudhuri et al., "An Overview of Business Intelligence Technology," Communications of the ACM, Aug. 2011, vol. 54, No. 8.
Official Communication for New Zealand Patent Application No. 628161 dated Aug. 25, 2014.
Official Communication for European Patent Application No. 14189344.6 dated Feb. 29, 2016.
Palantir, "The Repository Element," https://docs.palantir.com/gotham/3.11.1.0/dataguide/kite_config_file.04 printed Aug. 30, 2013 in 2 pages.
Official Communication for New Zealand Patent Application No. 622513 dated Apr. 3, 2014.
Official Communication for Great Britain Patent Application No. 1404486.1 dated Aug. 27, 2014.
Palantir, "Kite Operations," Palantir Technologies, Inc., Copyright 2010, p. 1.
Official Communication for European Patent Application No. 15155845.9 dated Oct. 6, 2015.
Parker, Jr. et al., "Detection of Mutual Inconsistency in Distributed Systems," IEEE Transactions in Software Engineering, May 1983, vol. SE-9, No. 3, pp. 241-247.
Loeliger, Jon, "Version Control with Git," O'Reilly, May 2009, pp. 330.
Lamport, "Time, Clocks and the Ordering of Events in a Distributed System," Communications of the ACM, Jul. 1978, vol. 21, No. 7, pp. 558-565.
Official Communication for European Patent Application No. 14158977.0 dated Apr. 16, 2015.
Official Communication for Great Britain Patent Application No. 1404479.6 dated Aug. 12, 2014.
Official Communication for Great Britain Patent Application No. 1404499.4 dated Aug. 20, 2014.
JetScreenshot.com, "Share Screenshots via Internet in Seconds," <http://web.archive.org/web/20130807164204/http://www.jetscreenshot.com/>, Aug. 7, 2013, pp. 1.
Kokossi et al., "D7-Dynamic Ontoloty Management System (Design)," Information Societies Technology Programme, Jan. 10, 2002, pp. 1-27.
"Remove a Published Document or Blog Post," Sharing and Collaborating on Blog Post.
Bluttman et al., "Excel Formulas and Functions for Dummies," 2005, Wiley Publishing, Inc., pp. 280, 284-286.
Official Communication for Great Britain Patent Application No. 1404489.5 dated Aug. 27, 2014.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Niepert et al., "A Dynamic Ontology for a Dynamic Reference Work", Joint Conference on Digital Libraries, Jun. 17-22, 2007, Vancouver, British Columbia, Canada, pp. 1-10.
Zheng et al., "GOEAST: a web-based software toolkit for Gene Ontology enrichment analysis," Nucleic acids research 36.suppl 2 (2008): pp. W385-W363.
Official Communication for New Zealand Patent Application No. 622473 dated Mar. 27, 2014.
Palantir, "Write a Kite Configuration File in Eclipse," Palantir Technologies, Inc., Copyright 2010, pp. 2.
Official Communication for Australian Patent Application No. 2013251186 dated Mar. 12, 2015.
Official Communication for New Zealand Patent Application No. 622497 dated Mar. 26, 2014.
Official Communication for European Patent Application No. 14158977.0 dated Jun. 10, 2014.
Mattern, F., "Virtual Time and Global States of Distributed Systems," Cosnard, M., Proc. Workshop on Parallel and Distributed Algorithms, Chateau de Bonas, France:Elsevier, 1989, pp. 215-226.
Anonymous, "BackTult _ JD Edwards One World Version Control System," printed Jul. 23, 2007 in 1 page.
Ma et al., "A New Approach to Secure Logging," ACM Transactions on Storage, vol. 5, No. 1, Article 2, Published Mar. 2009, 21 pages.
Wollrath et al., "A Distributed Object Model for the Java System," Conference on Object-Oriented Technologies and Systems, Jun. 17-21, 1996, pp. 219-231.
Miklau et al., "Securing History: Privacy and Accountability in Database Systems," 3 rd Biennial Conference on Innovative Data Systems Research (CIDR), Jan. 7-10, 2007, Asilomar, California, pp. 387-396.
Notice of Acceptance for Australian Patent Application No. 2013251186 dated Nov. 6, 2015.
Microsoft, "Using the Clipboard," <http://msdn.microsoft.com/en-us/library/ms649016.aspx>, printed Jun. 8, 2009 in 20 pages.
Official Communication for Canadian Patent Application No. 2666364 dated Jun. 4, 2012.
SnagIt, "SnagIt 8.1.0 Print Out 2," Software release date Jun. 15, 2006, pp. 1-3.
Official Communication for New Zealand Patent Application No. 622389 dated Mar. 20, 2014.
O'Reilly.com, http://oreilly.com/digitalmedia/2006/01/01/mac-os-x-screenshot-secrets.html published Jan. 1, 2006 in 10 pages.
Intellectual Property of Great Britain, "Search Report" in application No. 13139502.9 dated Apr. 15, 2014, 3 pages.
New Zealand Intellectual Property Office, "First Examination Report" in application No. 617128, dated Nov. 13, 2013, 2 pages.
U.S. Appl. No. 14/883,498, filed Oct. 14, 2015, Office Action, dated Mar. 17, 2016.
U.S. Appl. No. 13/669,274, filed Nov. 5, 2012, Office Action, dated May 2, 2016.
U.S. Appl. No. 14/883,498, filed Oct. 14, 2015, First Office Action Interview, dated Dec. 24, 2015.
U.S. Appl. No. 14/108,187, filed Dec. 16, 2013, Interview Summary, dated Apr. 17, 2014.
U.S. Appl. No. 14/192,767, filed Feb. 27, 2014, First Office Action Interview, dated May 6, 2014.

(56) References Cited

OTHER PUBLICATIONS

U.S. Appl. No. 14/800,447, filed Jul. 15, 2015, Interview Summary, dated Mar. 3, 2016.
U.S. Appl. No. 13/827,491, filed Mar. 14, 2013, Office Action, dated Oct. 9, 2015.
U.S. Appl. No. 14/196,814, filed Mar. 4, 2014, Interview Summary, dated Aug. 13, 2014.
U.S. Appl. No. 14/715,834, filed May 19, 2015, Office Action Interview, dated Apr. 13, 2016.
U.S. Appl. No. 14/135,289, filed Dec. 19, 2013, Interview Summary, dated Apr. 16, 2014.
U.S. Appl. No. 14/961,481, filed Dec. 7, 2015, Notice of Allowance, dated May 2, 2016.
U.S. Appl. No. 14/841,338, filed Aug. 31, 2015, Office Action, dated Feb. 18, 2016.
U.S. Appl. No. 13/669,274, filed Nov. 5, 2012, Final Office, dated May 6, 2015.
U.S. Appl. No. 14/842,734, filed Sep. 1, 2015, First Office Action Interview, dated Nov. 19, 2015.
U.S. Appl. No. 14/479,160, filed Sep. 5, 2014, First Office Action Interview, dated Apr. 20, 2016.
U.S. Appl. No. 14/268,964, filed May 2, 2014, Office Action, dated Jul. 11, 2014.
U.S. Appl. No. 14/265,637, filed Apr. 30, 2014, Notice of Allowance, dated Feb. 13, 2015.
U.S. Appl. No. 14/108,187, filed Dec. 16, 2013, First Office Action Interview, dated Mar. 20, 2014.
U.S. Appl. No. 14/741,256, filed Jun. 16, 2015, Office Action, dated Feb. 9, 2016.
U.S. Appl. No. 12/836,801, filed Jul. 15, 2010, Notice of Allowance, dated Apr. 16, 2013.
U.S. Appl. No. 13/669,274, filed Nov. 5, 2012, First Office Action Interview, dated Jul. 30, 2014.
U.S. Appl. No. 14/571,098, filed Dec. 15, 2014, First Office Action Interview, dated Aug. 5, 2015.
U.S. Appl. No. 14/102,394, filed Dec. 10, 2013, Office Action, dated Mar. 27, 2014.
U.S. Appl. No. 14/571,098, filed Dec. 15, 2014, First Office Action Interview, dated Nov. 10, 2015.
U.S. Appl. No. 13/669,274, filed Nov. 5, 2012, Advisory Action, dated Aug. 26, 2015.
U.S. Appl. No. 14/332,306, filed Jul. 15, 2014, First Office Action Interview, dated May 20, 2016.
U.S. Appl. No. 14/222,364, filed Mar. 21, 2014, Office Action, dated Dec. 9, 2015.
U.S. Appl. No. 14/192,767, filed Feb. 27, 2014, Interview Summary, dated Sep. 24, 2014.
U.S. Appl. No. 12/556,321, filed Sep. 9, 2009, Office Action, dated Jul. 7, 2015.
U.S. Appl. No. 14/076,385, filed Nov. 11, 2013, First Office Action Interview, dated Jan. 29, 2014.
U.S. Appl. No. 14/800,447, filed Jul. 15, 2012, First Office Action Interview, dated Dec. 10, 2010.
U.S. Appl. No. 14/871,465, filed Sep. 30, 2015, First Office Action Interview, dated Apr. 11, 2016.
U.S. Appl. No. 12/556,321, filed Sep. 9, 2009, Final Office Action, dated Jun. 6, 2012.
U.S. Appl. No. 14/265,637, filed Apr. 30, 2014, First Action Interview, dated Sep. 26, 2014.
U.S. Appl. No. 13/669,274, filed Nov. 5, 2012, First Office Action Interview, dated Nov. 3, 2014.
U.S. Appl. No. 12/566,318, filed Sep. 9, 2009, Notice of Allowance, dated Apr. 11, 2016.
U.S. Appl. No. 14/522,336, filed Nov. 24, 2014, First Office Action Interview, dated Jul. 20, 2015.
U.S. Appl. No. 12/556,321, filed Sep. 9, 2009, Office Action, dated Feb. 25, 2016.
U.S. Appl. No. 14/571,098, filed Dec. 15, 2014, First Office Action Interview, dated Aug. 24, 2015.
U.S. Appl. No. 14/076,385, filed Nov. 11, 2013, Office Action, dated Sep. 23, 2014.
U.S. Appl. No. 14/076,385, filed Nov. 11, 2013, Advisory Action, dated Mar. 24, 2016.
U.S. Appl. No. 14/552,336, filed Nov. 24, 2014, Notice of Allowance, dated Nov. 3, 2015.
U.S. Appl. No. 14/289,596, filed May 28, 2014, Final Office Action, dated Aug. 5, 2015.
U.S. Appl. No. 14/975,215, filed Dec. 18, 2015, First Office Action Interview, dated May 19, 2016.
U.S. Appl. No. 12/556,321, filed Sep. 9, 2009, Office Action, dated Dec. 7, 2011.
U.S. Appl. No. 14/135,289, filed Dec. 19, 2013, First Office Action Interview, dated Jul. 7, 2014.
U.S. Appl. No. 14/715,834, filed May 19, 2015, Office Action, dated Jun. 28, 2016.
U.S. Appl. No. 14/871,465, filed Sep. 30, 2015, First Office Action Interview, dated Feb. 9, 2016.
U.S. Appl. No. 12/836,801, filed Jul. 15, 2010, Office Action, dated Sep. 6, 2012.
U.S. Appl. No. 13/827,491, filed Mar. 14, 2013, Final Office Action, dated Jun. 22, 2015.
U.S. Appl. No. 14/800,447, filed Jul. 15, 2012, Final Office Action, dated Jun. 6, 2016.
U.S. Appl. No. 14/148,568, filed Jan. 6, 2014, Office Action, dated Mar. 26, 2015.
U.S. Appl. No. 14/508,696, filed Oct. 7, 2014, Office Action, dated Mar. 2, 2015.
U.S. Appl. No. 14/148,568, filed Jan. 6, 2014, Final Office Action, dated Oct. 22, 2014.
U.S. Appl. No. 14/223,918, filed Mar. 24, 2014, Office Action, dated Jun. 8, 2015.
U.S. Appl. No. 14/479,863, filed Sep. 8, 2014, First Office Action, dated Dec. 26, 2014.
U.S. Appl. No. 14/490,612, filed Sep. 18, 2014, First Office Action Interview, dated Mar. 31, 2015.
U.S. Appl. No. 14/280,490, filed May 16, 2014, First Office Action Interview, dated Jul. 24, 2014.
U.S. Appl. No. 14/490,612, filed Sep. 18, 2014, First Office Action Interview, dated Jan. 27, 2015.
U.S. Appl. No. 14/076,385, filed Nov. 11, 2013, First Office Action Interview, dated Apr. 8, 2014.
U.S. Appl. No. 14/076,385, filed Nov. 11, 2013, Office Action, dated Jun. 2, 2015.
U.S. Appl. No. 14/830,420, filed Aug. 19, 2015, Office Action, dated Jan. 23, 2017.
U.S. Appl. No. 14/830,420, filed Aug. 19, 2015, Office Action, dated Jul. 12, 2016.
U.S. Appl. No. 14/156,208, filed Jan. 15, 2014, Final Office Action, dated Aug. 11, 2015.
U.S. Appl. No. 14/156,208, filed Jan. 15, 2014, Office Action, dated Mar. 9, 2015.
U.S. Appl. No. 14/715,834, filed May 19, 2015, First Office Action Interview, dated Feb. 19, 2016.
U.S. Appl. No. 14/334,232, filed Jul. 17, 2014, Notice of Allowance, dated Nov. 10, 2015.
U.S. Appl. No. 13/657,684, filed Oct. 22, 2012, Office Action, dated Aug. 28, 2014.
U.S. Appl. No. 14/473,860, filed Oct. 20, 2014, Notice of Allowance, dated Jan. 5, 2015.
U.S. Appl. No. 14/334,232, filed Nov. 10, 2015, Office Action, dated Jul. 10, 2015.
U.S. Appl. No. 14/076,385, filed Nov. 11, 2013, Final Office Action, dated Jan. 22, 2015.
U.S. Appl. No. 12/286,485, filed May 23, 2014, Notice of Allowance, dated Jul. 29, 2015.
U.S. Appl. No. 12/286,485, filed May 23, 2014, First Office Action Interview, dated Mar. 12, 2015.
U.S. Appl. No. 14/518,757, filed Oct. 20, 2014, Final Office Action, dated Jul. 20, 2015.
U.S. Appl. No. 12/286,485, filed May 23, 2014, First Office Action Interview, dated Apr. 30, 2015.

(56) References Cited

OTHER PUBLICATIONS

U.S. Appl. No. 14/518,757, filed Oct. 20, 2014, Office Action, dated Dec. 1, 2015.
U.S. Appl. No. 13/657,684, filed Oct. 22, 2012, Notice of Allowance, dated Mar. 2, 2015.
U.S. Appl. No. 14/518,757, filed Oct. 20, 2014, First Office Action Interview, dated Apr. 2, 2015.
U.S. Appl. No. 14/156,208, filed Jan. 15, 2014, Interview Summary, dated Sep. 17, 2015.
U.S. Appl. No. 14/156,208, filed Jan. 15, 2014, Notice of Allowance, dated Feb. 12, 2016.
U.S. Appl. No. 14/473,860, filed Aug. 29, 2014, Notice of Allowance, dated Jan. 5, 2015.
U.S. Appl. No. 14/076,385, filed Nov. 11, 2013, Notice of Allowance, dated Dec. 2, 2016.
U.S. Appl. No. 14/044,800, filed Oct. 2, 2013, Notice of Allowance, dated Sep. 2, 2014.
U.S. Appl. No. 14/571,098, filed Dec. 15, 2014, First Office Action Interview, dated Mar. 11, 2015.
U.S. Appl. No. 13/669,274, filed Nov. 5, 2012, Final Office Action, dated May 6, 2015.
U.S. Appl. No. 13/669,274, filed Nov. 5, 2012, Interview Summary, dated Jul. 28, 2016.
U.S. Appl. No. 13/669,274, filed Nov. 5, 2012, Notice of Allowance, dated Aug. 29, 2016.
U.S. Appl. No. 14/830,420, filed Aug. 19, 2015, Final Office Action, dated Sep. 28, 2017.
U.S. Appl. No. 14/726,204, filed May 29, 2015, Notice of Allowance, dated Jul. 25, 2017.
U.S. Appl. No. 14/726,204, filed May 29, 2015, Office Action, dated Jun. 27, 2016.
Official Communication for European Patent Application No. 11807426.9 dated Nov. 15, 2016.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Symantec Corporation, "E-Security Begins with Sound Security Policies," Announcement Symantec, Jun. 14, 2001.
Official Communication for Canadian Patent Application No. 2831660 dated Jun. 9, 2015.
Official Communication for Canadian Patent Application No. 2,826,905 dated Oct. 17, 2016.

* cited by examiner

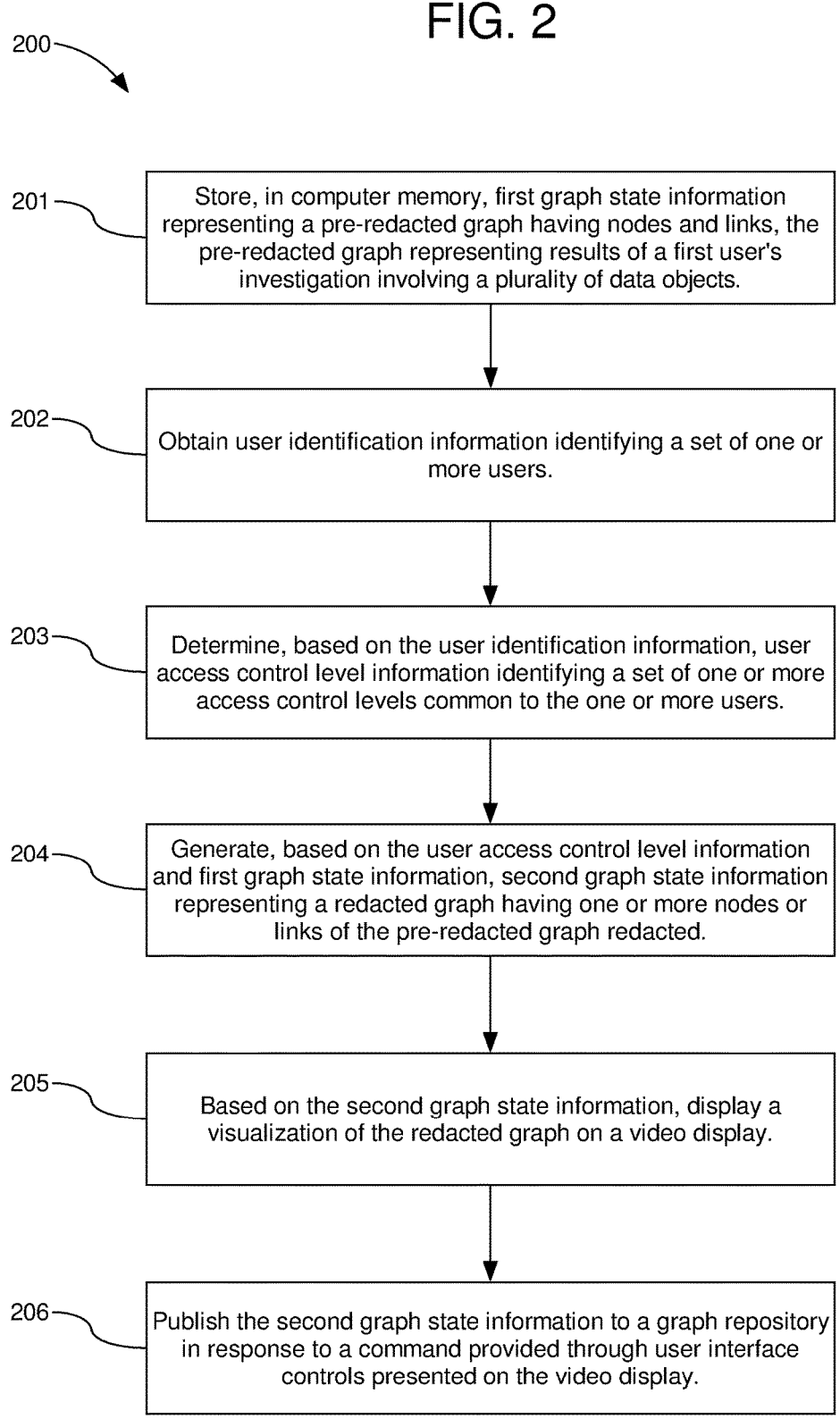

SYSTEM AND METHOD FOR SHARING INVESTIGATION RESULTS

BENEFIT CLAIM

This application claims the benefit under 35 U.S.C. § 120 as a continuation of application Ser. No. 13/669,274, filed Nov. 5, 2012, the entire contents of which is hereby incorporated herein by reference for all purposes as if fully set forth herein. Applicants hereby rescind any disclaimer of claim scope in the parent application(s) or the prosecution history thereof and advise the USPTO that the claims in this application may be broader than any claim in the parent applications.

COPYRIGHT STATEMENT

A portion of the disclosure of this patent document may contain material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. Copyright 2012, Palantir Technologies, Inc.

TECHNICAL FIELD

The present disclosure relates generally to computer systems for investigative analysis and, more particularly, to the design and use of computer systems for sharing investigation results produced by one user with other users.

BACKGROUND

The increased sophistication of computing, including artificial intelligence, data mining, statistics, machine learning, and database systems, requires a better paradigm for computer-based investigative analysis. The deficiencies of data mining—the use of statistical algorithms to extract patterns and insight from raw data—are an important catalyst for the new requirements for investigative analysis systems. With data mining, using computers to detect credit card fraud, to recommend the next movie to rent, or to find a good place to eat in a new city have become a part of our daily life.

However, data mining has limitations for use as an investigative analysis technique. From a technical perspective, automated data mining techniques are well-suited when the nature and composition of the underlying data does not change over time, the data is complete and clean, and the querier has some idea what he or she is looking for.

Unfortunately, many of hardest, most complex, and critical data problems that exist today do not have data characteristics that are well-suited for data mining techniques. These problems tend to involve data that comes from many disparate sources, is incomplete and inconsistent, and is created by those who are trying to avoid leaving a trail that is easy to follow. Further complicating matters, these problems are often bound up with social and privacy concerns. People generally are uncomfortable having a computer being a final arbiter when lives or livelihoods are on the line. Examples of where such problems can be found include fields such as intelligence analysis and police investigations. With these types of data problems, automated algorithmic approaches are sub-optimal because they omit human involvement at critical steps.

Accordingly, a need remains in the art for an investigative analysis system that addresses these and other issues.

SUMMARY

The above deficiencies and other problems associated with using data mining techniques for certain investigative analyses are reduced or eliminated by the disclosed investigative analysis system.

In some embodiments, a user of the system can share results of an investigation on a body of data with other users in a way that allows the sharing user to visualize how the results will be shared with the other users before they are shared. In some embodiments, the results of the investigation are shared in the form of a visual graph having nodes and edges. In some embodiments, the visual graph also has other presentation elements (e.g., non-node and non-edge components) in addition to nodes and edges. These other presentation elements may include textual notes, property boxes, audio content, video content, audio/video content, documents, or other presentable information. In some embodiments, the nodes of the graph represent data objects that are the subject of the investigation and the edges represent connections between the data objects. In some embodiments, the graph is shared with the other users in the form of an automatically generated redacted graph omitting nodes, edges, and/or other presentation elements for which the other users do not have permission to view. In some embodiments, the sharing user is presented with a visualization of the automatically generated redacted graph before it is shared with the other users providing the sharing user an opportunity to confirm that sharing the redacted graph with the other users will not constitute an information leakage and to confirm that the redacted graph will be meaningful to the other users' investigations. By doing so, the superior pattern matching and inference machinery of the human brain is involved in the decision of whether the results of one user's investigation are appropriate to share with other users.

BRIEF DESCRIPTION OF DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 2 is a flowchart of a methodology for sharing investigation results that may be performed by the graph sharing application of the investigative analysis system.

DESCRIPTION OF EMBODIMENT(S)

Introduction

Figure 1A:
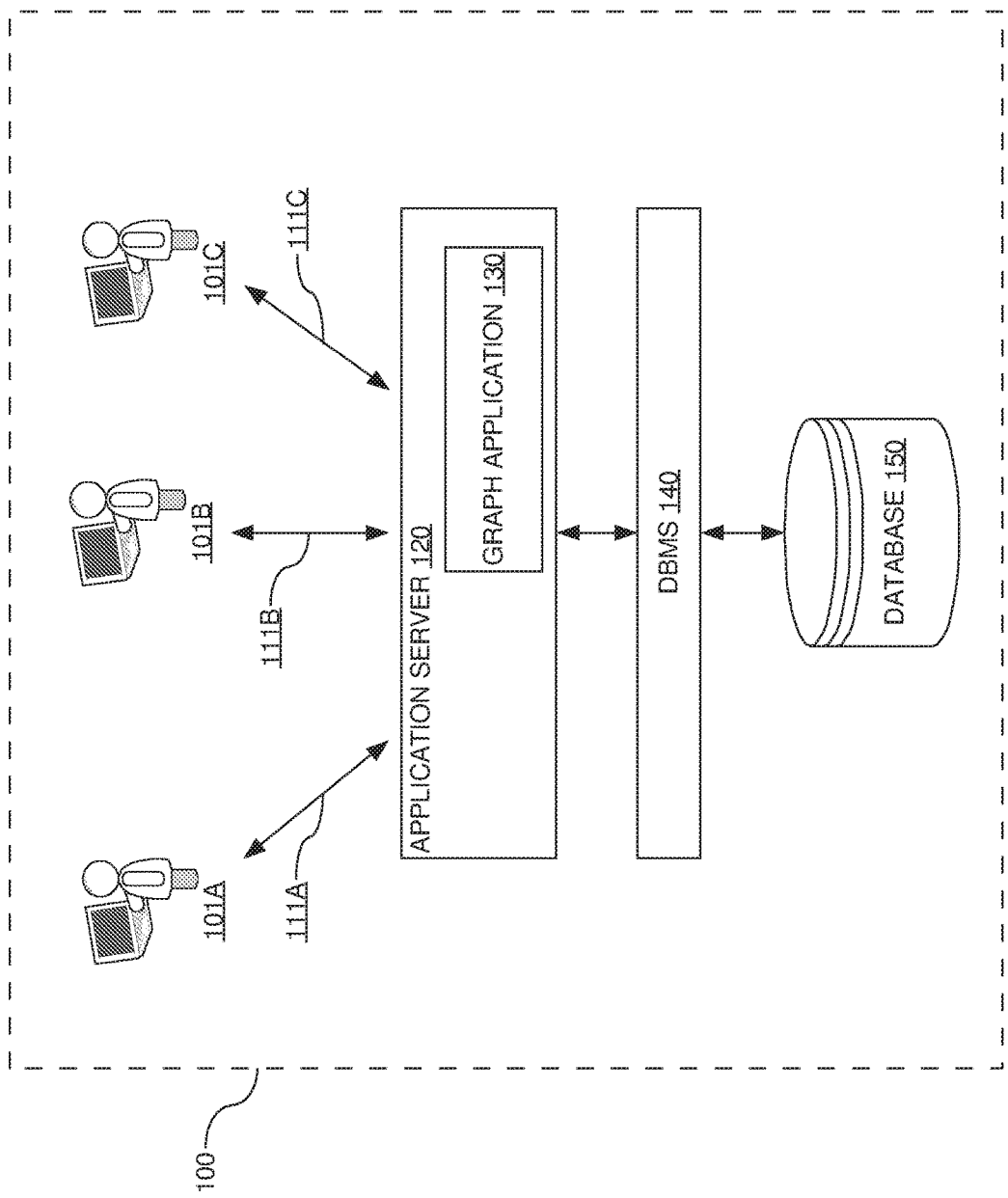
FIG. 1A is a block diagram of a graph sharing investigative analysis system.

In the following description, for the purposes of explanation, numerous specific details are set forth in order to provide a thorough understanding of the present invention.

It will be apparent, however, that the present invention may be practiced without these specific details. In other instances, well-known structures and devices are shown in block diagram form in order to avoid unnecessarily obscuring the present invention.

It will be understood that, although the terms first, second, etc. may be used herein to describe various elements, these elements should not be limited by these terms. These terms are only used to distinguish one element from another. For example, a first graph could be termed a second graph, and, similarly, a second graph could be termed a first graph, without departing from the scope of the present invention. The first graph and the second graph are both graphs, but they are not the same graph.

The terminology used herein is for the purpose of describing particular embodiments only and is not intended to be limiting of the invention. As used herein, the singular forms "a", "an", and "the" are intended to include the plural forms as well, unless the context clearly indicates otherwise. Use of "criteria" may indicate either or both of the singular usage of the term, "criterion", or the plural form "criteria", or vice versa.

It will also be understood that the term "and/or" as used herein refers to and encompasses any and all possible combinations of one or more of the associated listed items. It will be further understood that the terms "comprises" and/or "comprising", when used herein, specify the presence of stated features, integers, steps, operations, elements, components and/or groups, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event" or "in response to detecting [the stated condition or event]," depending on the context.

Overview

In general, the present disclosure relates to an investigative analysis system in which a user can share results of an investigation with other users in a way that allows the sharing user to visualize how the results will be shared with the other users before they are shared. In some embodiments, the results of the investigation are shared in the form of a visual graph having nodes and edges.

In some embodiments, the visual graph also has other presentation elements (e.g., non-node and non-edge components) in addition to nodes and edges. These other presentation elements may include textual notes, property boxes, audio content, video content, audio/video content, documents, or other presentable information.

In some embodiments, the nodes of the graph represent data objects that are the subject of the investigation and the edges represent connections between the data objects.

In some embodiments, the graph is shared with the other users in the form of an automatically generated redacted graph omitting nodes, edges, and/or other presentation elements for which the other users do not have permission to view.

In some embodiments, the sharing user is presented with a visualization of the automatically generated redacted graph before it is shared with the other users providing the sharing user an opportunity to confirm that sharing the redacted graph with the other users will not constitute an information leakage and to confirm that the redacted graph will be meaningful to the other users' investigations. By doing so, the superior pattern matching and inference machinery of the human brain is involved in the decision of whether the results of one user's investigation are appropriate to share with other users.

Graph Sharing Investigative Analysis System

In some embodiments, the present disclosure relates to an investigative analysis system in which a user can share results of an investigation with other users in a way that allows the sharing user to visualize how the results will be shared with the other users before they are shared. By doing so, the system allows the sharing user to visual confirm that sharing the graph would not represent an information leakage and, at the same, will provide meaningful information to the other users.

An example investigative analysis system 100 is illustrated in FIG. 1A. As shown, the system 100 includes one or more user sites 101A-C operatively coupled respectively by one or more network communication links 111A-C to an application server 120 that hosts a graph application 130. The graph application 130, as part of the application server 120, accesses a database 150 by way of a database management system 140. User sites 101A-C and server 120 may comprise one or more computers that host or execute logic or stored programs configured to perform the processes that are further described herein.

A user at a user site 101 conducts, using a computing device at the site 101, an investigation involving data objects stored in the database 150. Generally, an investigation is a separate line of inquiry or analysis on a subset of shared database data drawn from a shared data repository in the database 150. Investigations allow users at user sites 101 to explore competing hypotheses. For example, if the user at site 101A has a first hypothesis regarding a subset of database data, and the user at site 101B has a second competing hypothesis regarding the same subset of database data, investigations allow both analysts to pursue their own hypothesis on the subset without interfering or contradicting each other.

During an investigation, changes made to the subset of data of the investigation are not visible to other users at other user sites 101 and do not conflict with changes to the subset made by other users at other user sites 101 either in another investigation or to the base copy of the subset in the shared data repository of the database 150 from which the investigation subset was drawn.

Changes made during an investigation are made visible to other users at other sites 101 by publishing the changes to the shared data repository of the database 150. Publishing changes to the shared data repository may require reconciliation with other changes made outside the context of the investigation. In some cases, reconciliation occurs automatically. In other cases, manual reconciliation is required.

In some embodiments, a user at a site 101, using the graph application 130, may produce, in the context of an investigation the user is conducting, results of the investigation in the form of a graph that reflects changes made during the investigation. The graph may be created with the use of graph application 130 and stored in a computer memory. Among other functions, the graph application 130 drives an interactive user interface presented on a video display at a user site 101 (e.g., a computer monitor). Among other features, the user interface allows a user at the user site 101 to visualize data objects that are the subject of the investigation by plotting each data object as a separate node of the graph and displaying any known connections between each data object as edges connecting the nodes. For example, an edge of the graph connecting two nodes may represent a shared property, a personal relationship, or mutual participation in an event. As another possible feature, the user interface may allow the user at the user site 101 to create a new association between two data objects in the investigation by dragging (e.g., with a pointing device or with a finger or stylus applied to a touch screen) a line between the two nodes of the graph representing the two data objects.

In some embodiments, a user at a user site 101 can publish a graph created during an investigation to a graph repository in the database 150 where other users at other sites 101 can retrieve the published graph into their own investigations for further analysis. In this way, a user at one user site 101 can share results of investigation with other users at other sites 101. This process can continue as the analysis is handed back and forth between investigative teams.

As a particular example, a user at user site 101A can publish a first graph to the graph repository. Another user at user site 101B can bring the first graph into another investigation whereupon a second graph based on the first graph is published back to the graph repository. From there, the user at user site 101A can retrieve the second graph into his or her investigation to continue the analysis based on the second graph created by the user at user site 101B. The publishing, bringing and receiving involve networked communication of data between the computers involved in the interactions that are described.

In some embodiments, the graph application 130 drives an interactive graph sharing user interface presented on a video display at a user site 101 that allows a user at the user site 101 to publish a graph created during an investigation to the graph repository. In some embodiments, the graph sharing user interface allows the user to specify other users that are to receive the graph. Based on the users specified, the graph application 130 automatically creates a redacted version of the graph in which nodes and edges that the specified users do not have permission to view are redacted. The graph application 130 presents the redacted graph on the video display to allow the publishing user to confirm the contents of the redacted graph before publishing the redacted graph to the graph repository. If the publishing user is satisfied with the contents of the redacted graph, the publishing user can command the graph application 130 through the user interface to publish the redacted graph to the graph repository.

As a particular example, an intelligence analyst at a user site 101A in country or state A may wish to share results of an investigation with another intelligence analyst at a user site 101B in another country or state B. With the graph application 130, the intelligence analyst of jurisdiction A can visually confirm contents of a redacted graph to be shared with the intelligence analyst of jurisdiction B does not represent an information leakage and, at the same time, represents investigative results useful to the intelligence analyst of jurisdiction B.

At each user site 101 there is a client computing device used by a user at that site that communicates and exchanges data with the application server 120 over a network communication link 111. The client computing device may be virtually any client computer such as workstation computer, a laptop computer, a tablet computer, a mobile phone, or other client computing device that has or is operatively coupled to a video display. While only three user sites 101 are shown in FIG. 1A, the system 100 may include more than three or less than three user sites 101.

A network communication link 111 may traverse one or more data networks (e.g., Local Area Networks and Wide Area Networks). A network communication link 111 may be based on a reliable network transport protocol such as TCP/IP or the like. A network communication link 111 between a user site 101 and the application server 120 may be established as and when needed, for example, when the application server 102 or the client computing device at the user site 101 needs to send data to the other. Alternatively, the network communication link 111 may span the life of a session during which data is sent back and forth between the application server 120 and the user site 101 in multiple communication exchanges. Either the application 120 or the client computing device at the user site 101 may initiate establishment of the network communication link 111. A network communication link 111 may traverse a number of intermediary devices (e.g., web servers, cache servers, proxy servers, content delivery network servers, etc.) between an application server 120 device and the client computing device at the user site 101. In this case, the network communication link 111 may be viewed as a logical network communication link made up of a number of sub-network communication links connecting the client computing device to the application server 120 device through the intermediary devices in a network.

The client computing device at the user site 101 is configured with a Web browsing application or other client application for performing client functions of the graph application 130. Among others, the client functions include presenting various graph application 130 user interfaces on the video display of the client computing device, as instructed over one or more network communication links 111 by the graph application 130. The client functions may also include receiving user input from the user of the client computing device and transmitting data representing user input to the graph application 130 over one or more network communication links 111. The graph application 130 may instruct the client application to present the various graph application user interface using standardized Web instructions sent over one or more network communications links 111 to the client computing device. Such Web instructions may involve standardized Web protocols (e.g., HTTP, HTTPS, etc.) and include standardized markup language instructions (e.g., XML, HTML, XHTML, etc.), standardized style sheet language instructions (e.g., CSS, etc.), and standardized client-side scripting language instructions (e.g., JavaScript®, ActionScript®, and Jscript®, etc.). Receipt of data by the graph application 130 representing user input may also involve standardized Web protocols and standardized Web instructions.

The application server 120 contains the graph application 130 and operates on one or more server computing devices. The server computing devices on which the graph application 130 operates may be considered to be operatively coupled to the video displays at user sites 101 by network communication links 111 and the client computing devices at the user sites 101. The application server 120 provides fundamental application data services to the graph application 130 such as handling network communications with user sites 101 and providing an interface to the graph application 130 for communicating with the database management service 140. According to some aspects of the present invention, the graph application 130 is implemented using the Java programming language. However, implementation with other programming languages or in hardware (e.g., hard-wired logic, one or more ASICs or FPGAs, firmware, etc.) are also possible.

Graph Sharing Application

Figure 1B:
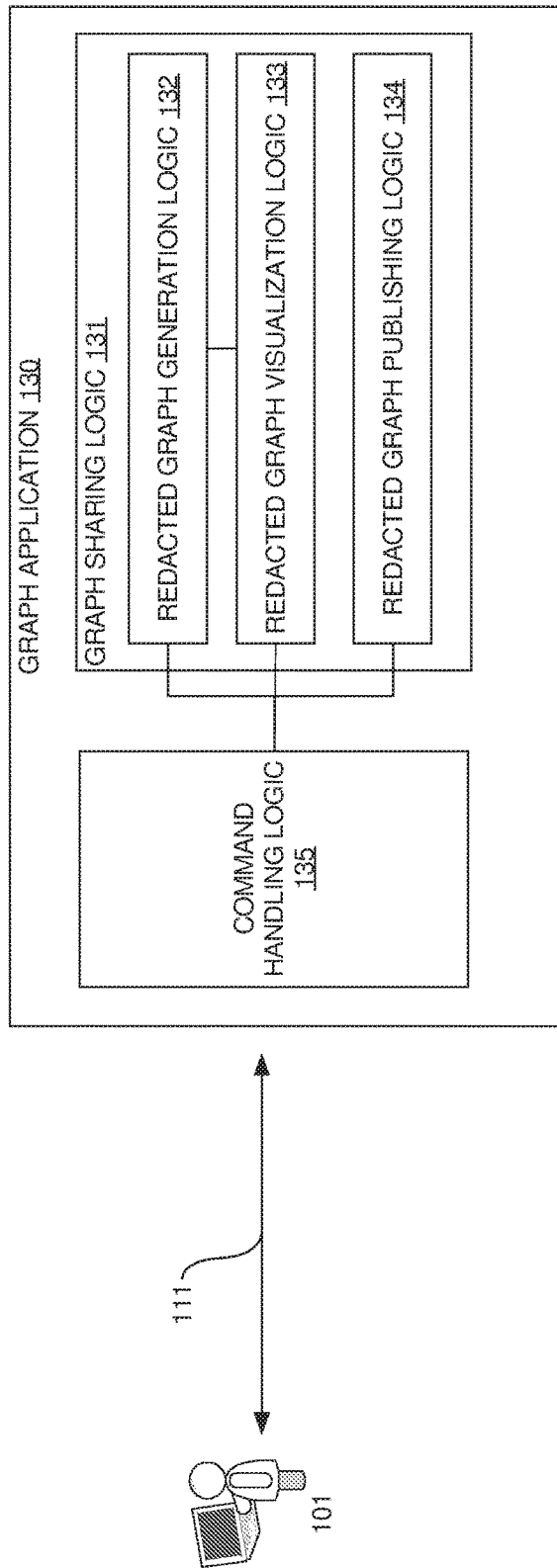
FIG. 1B is a block diagram of a graph sharing application of the investigative analysis system.

FIG. 1B is a block diagram of an embodiment of the graph application 130. As shown, the graph application 130 includes a number of logic elements which may be implemented in software or hardware or a combination of the two. A graph sharing logic element 131 includes a redacted graph generation logic element 132 for generating a redacted graph, a redacted graph visualization logic element 133 for displaying a redacted graph on a video display at a user site 101 operatively coupled to the graph application 130 by a network communication link 111, and a redacted graph publishing logic element 134 for publishing a redacted graph to the graph repository of the database 150. The graph application 130 also includes a command handling logic element 135 for receiving notification of commands input by a user through user interface controls presented on the video display at the user site 101 and for dispatching received commands to the appropriate logic element of the graph application 130 to handle the command. The graph application 130 may include these and other logic elements.

Although in some embodiments the redacted graph generation, visualization, and publishing functions are performed at least in part by a graph application hosted by an application server, some or all of these functions may be performed by the computing devices at the user sites. For example, the computing devices may be configured with a graph application for performing some or all of these functions.

In an embodiment, operating on the database 150 (i.e., the organized information actually stored on a storage device) is a database management service (DBMS) 140 that, among other operations, processes requests from the application server 120 for access to information in the database 150. The graph application 130 may interact indirectly with the database 150 through the DBMS 140 that in turn interacts directly with the database 150 to provide high level database operations to the graph application 130, such as retrieval and storage of information in the database 150. No particular type of database management service is required and any database management service capable of supporting the graph sharing techniques described herein may be used. In some embodiments, as examples, the DBMS 140 is a relational database management system such as those commercially available from Oracle Corporation of Redwood Shores, Calif. and Microsoft Corporation of Redmond, Wash. Other embodiments may use open source databases.

In some embodiments, the database 150 (or a portion or portions thereof) is stored in volatile memory for faster data access to database data. In this case, the database 150 may be backed by a shadow copy of the database 150 stored in a non-volatile memory in case of power loss to the volatile memory.

Graph Sharing Database

Figure 1C:
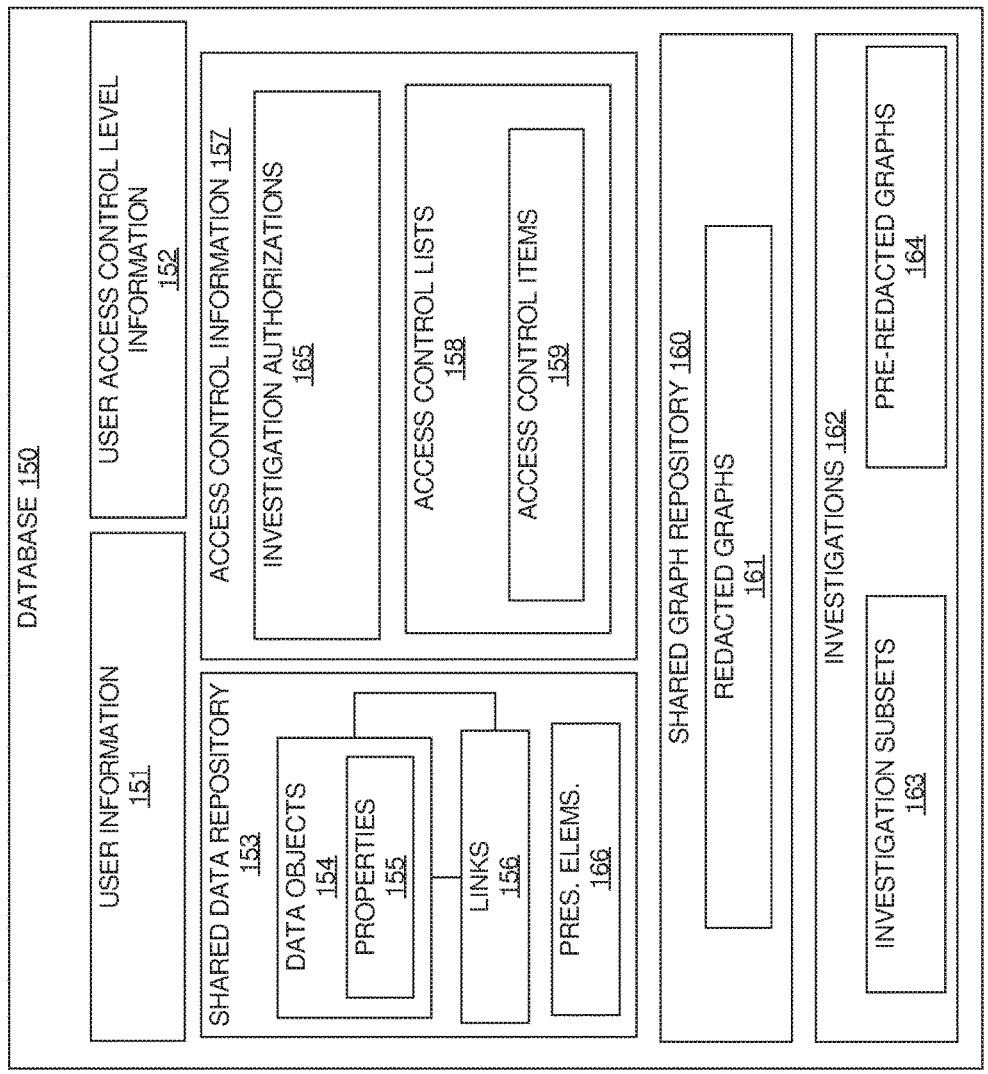
FIG. 1C is a block diagram of a graph sharing database of the investigative analysis system.

FIG. 1C is a block diagram of information stored in the database 150 involved in sharing graph operations in an embodiment. Conceptually, the database 150 is segmented into user information 151, user access control level information 151, a shared data repository 153, a shared graph repository 160, and investigation data 162. No particular type of database is required and any database capable of supporting the graph sharing techniques described herein may be used. As just one non-limiting example, the database 150 is a relational database. The information stored in the database 150 may also be stored as a result of performing graph sharing operations in computer memory of the server computing devices that operate the graph sharing application 130 and in computer memory of client computing devices at user sites 101.

User information 151 includes data identifying individual users of the graph sharing application 130. Such data may include user identification information uniquely identifying individual users and credential information for authenticating individual users. Credential information may include username and password information and/or cryptographic digital certificate information as examples. User information 151 may also include collaboration team data. A collaboration team is a set of one or more users identified by a team name. Collaboration teams allow reference to a set of one or more individual users by a single identifier akin to e-mail messaging groups.

User access control level information 152 includes information identifying which access control levels users have. In some embodiments, there are two types of access control levels: groups and classifications. Groups may also be referred to as roles. The access control groups to which a user belongs determine what operations the user can perform on which data in the shared data repository 153. The access control groups to which a user belongs also determine what data in the shared data repository 153 the user can bring into an investigation 162. The access control classifications a user has determines what data in the shared data repository 153 the user has access to and what data in the shared data repository 153 the user can bring into an investigation 162.

A user may belong to more than one access control group and have more than one access control classification. Access control groups and access control classifications may be hierarchical such that, if a user belongs to an access control group or has an access control classification higher in the hierarchy, then the user implicitly belongs to all groups and has all classifications lower than that group or classification in the hierarchy.

Access control groups and access control classifications may be associated with properties 155, links 156, and other presentation elements 166 through access control lists 158. An access control list 158 has a set of one or more access control items 159. An access control item 159 can specify an access control group or a classification.

When specifying an access control group, an access control item 159 includes an access control group name or identifier and a permission of that access control group. In some embodiments, there are four permissions levels: discovery, read, write, and owner. With the discovery permission, a user can be notified of and know that data exists but cannot view the data. With the read permission, a user can find and read the data but cannot change the data. With the write permission, a user can find, read, and change the data. With the owner permission, a user can find, read, change, and adjust the permissions on the data. Thus, permissions may be cumulative. For example, a user that has the write permission with respect to data implicitly also has the read and discovery permissions with respect to that data. Embodiments are not limited to these four permission levels and other sets of permissions levels may be used.

When specifying an access control classification, an access control item 159 includes a classification marking that identifies the classification. Example classification markings include Top Secret (TS), Secret (S), Confidential (C), Restricted (R), and Unclassified (U). In an embodiment, a user is not allowed access to data in the shared data repository 153 unless the user has all classification markings specified in the access control list 158 associated with the data. Thus, in such an embodiment, classification access control items 159 of an access control list 158 override any permissions granted to a user by group access control items 159 of the access control list 158. The foregoing classification markings are NOTIONAL ONLY and provided solely for example purposes. As explained in greater detail below, access control information 157 associated with data objects 154 and links 156 that are the subject of an investigation may be used when sharing a graph to determine what nodes and edges of the graph to redact.

In some embodiments, investigative data stored in the shared data repository 153 is conceptually structured according to an object-centric data model. At the highest level of abstraction, there are data objects 154. A data object 154 is a container for information representing things in the world. For example, a data object 154 can represent an entity such as a person, a place, an organization, or other noun, or an event that happens at a point in time or for a duration, a document or other unstructured data source such as an e-mail message, a news report, or a written paper or article, or a digital media item such as audio or video. A data object 154 may have a type (e.g., Person, Event, or Document) and a display name which may be values of particular properties 155 of the data object 154.

Each data object 154 may have one or more properties 155. Properties 155 are attributes of the data object 154 that represent individual data items. Each property 155 of a data object 154 has a type and a value. Different types of data objects 154 may have different types of properties 155. For example, a Person data object 154 might have an Eye Color property 155 and an Event object 154 might have a Date property 155.

In some embodiments, the set of data object types and the set of property types for each type of data object are defined according to a pre-defined or user-defined ontology or other hierarchical structuring of knowledge through sub-categorization of object types and property types according to their relevant and/or cognitive qualities. A data object 154 may also be allowed to have more than one property 155 of the same type. For example, a Person data object 154 might have multiple Address properties 155 or multiple Name properties 155.

A link 156 represents a connection between two data objects 154. In some embodiments, the connection is either through a relationship, an event, or through matching properties.

A relationship connection may be asymmetrical or symmetrical. For example, Person data object A may be connected to Person data object B by a Child Of relationship (where Person data object B has an asymmetric Parent Of relationship to Person data object A), a Kin Of symmetric relationship to Person data object C, and an asymmetric Member Of relationship to Organization data object X. The type of relationship between two data objects may vary depending on the types of the data objects. For example, Person data object A may have an Appear In relationship with Document data object Y or have a Participate In relationship with Event data object E.

As an example of an event connection, two Person data objects 154 may be connected by an Airline Flight data object 154 representing a particular airline flight if they traveled together on that flight, or by a Meeting data object 154 representing a particular meeting if they both attended that meeting. In an embodiment, when two data objects 154 are connected by an event, they are also connected by relationships, in which each object 154 has a specific relationship to the event, such as, for example, an Appears In relationship.

As an example of a matching properties connection, two Person data objects 154 representing a brother and a sister, may both have an Address property 155 that indicates where they live. If the brother and the sister live in the same home, then their Address properties 155 likely contain similar, if not identical information. In an embodiment, a link 156 between two data objects 154 may be established based on similar or matching properties 155 of the data objects 154.

The above are just some examples of the types of connections that may be represented by a link 156 and other types of connections may be represented. Thus, it should be understood that embodiments are not limited to any particular types of connections between data objects 154. For example, a document data object 154 might contain two different tagged entities. A link 156 between two data objects 154 may represent a connection between these two entities through their co-occurrence within the same document.

In some embodiments, the shared data repository 153 stores other presentation elements 166 that are not data objects 154, properties 155, or links 156. These other presentation elements 166 may include textual notes, property boxes, audio content, video content, audio/video content, documents, or other presentable information. These other presentation elements 166 are referred to as "presentation" elements because they may be presented on a graph in addition to nodes and edges representing data objects 154 and links 156, respectively. It should be understood that it is not a requirement that presentation elements 166 and data objects 154 represent different types of information. Information represented by a presentation element 166 can instead by represented by a data object 154, and vice versa. For example, a document may be represented by a presentation element 166 and/or a data object 154.

In some embodiments, a property 155, a link 156, or a presentation element 166 may be associated with an access control list 158 that governs access users have to the property 155, link 156, or presentation element 166. In some embodiments, the level of access a user has to a property 155 or link 156 also affects the level of access the user has to a data object 154 associated with the property 155 or link 156. In particular, to view a data object 154, a user must have view access to at least one property 155 of that data object 154. If the user has view access to a link 156 from one data object 154 to another data object 154 but no view access to any properties 155 of the data object 154, then the user can view the data object 154 but it in a generic form that does not reveal any details of the data object 154. In some embodiments, to view a property 155 of a data object 154, a user must have at least read level access to that property 155. In some embodiments, to view a link 156, the user must have at least read level access to that link 156. In some embodiments, to view a presentation element 166, the user must have at least read level access to that presentation element 166.

Graph-Based Investigations

In some embodiments, a user at a user site 101 can use the graph application 130 to conduct a separate line of inquiry or analysis on a subset 163 of data objects 154, properties 155, links 156, and presentation elements 166 drawn from the shared data repository 153. This separate line of inquiry or analysis is referred to herein as an investigation 162. During an investigation 162, changes made to the investigation subset 163 of the investigation 162 are not visible to other users at other user sites 101 and do not conflict with changes to the data objects 154, the properties 155, the links 156, and the presentation elements 166 of the investigative subset 163 made by other users at other user sites 101 either in another investigation 162 or to the base copies of the data objects 154, the properties 155, the links 156, and the presentation elements 166 in the shared data repository 153 from which the investigation subset 163 was drawn. Changes made during an investigation 162 are made visible to other users at other sites 101 by "publishing" the changes to the shared data repository 153.

Investigation Authorizations

In some embodiments, the set of data objects 154, properties 155, links 156, and presentation elements 166 in the shared data repository 153 that can be drawn into a user's investigative subset 163 is constrained by investigation authorizations 165. An investigation authorization 165 is a set of access control groups and/or a set of access control classifications. An investigation authorization 165 is associated with an investigation 162 and represents the effective permission for the associated investigation 162. The effective permission determines the kind of data that can be drawn from the shared data repository 153 into the investigation 162. For example, if the investigation authorization 165 has the "Everyone" and the "Finance" group, only data in the shared data repository 153 that is authorized for Everyone, Finance, or for both can be brought into the investigation 162.

As a result of an associated investigation authorization 165, an investigation 162 may contain data authorized by each group or classification in the investigation authorization 165. In some embodiments, for a user to gain access to an investigation 162, the user, according to the user's user access control level information 152, must have at least the same set of access control groups and access control classifications as specified in the associated investigation authorization 165.

Pre-Redacted Graphs

In the context of an investigation 162, a user at a user site 101 can use the graph application 130 to make changes to the investigation subset 163 of the investigation 162 by creating and storing a graph 164. Like the investigation subset 163, the graph 164 is local to the investigation 162 until it is published to the shared graph repository 160. In some embodiments, a graph 164 created in the context of an investigation may be published to the shared graph repository 160 as a redacted graph 161 in which one or more nodes, edges, and/or other presentation elements 166 of the graph 164 created in the context of the investigation are redacted. In this sense, the graph 164 created in the investigation 162 may conceptually viewed as a pre-redacted graph 164.

For making changes to the investigation subset 163, the graph application 130 drives a user interface allowing the user to navigate and work with the contents of a graph 164. Among other possible features, the user interface may allow a user to add and remove data objects 154 to and from the graph 164, create and remove links 156 between data objects 154 of the graph 164, add and remove presentation element 166, and organize and format the graph 164 for presentation.

A pre-redacted graph 164 of an investigation 162 may be a collection of nodes, edges therebetween, and presentation elements 166. Each node of a pre-redacted graph 164 corresponds to a data object 154 that is the subject of the investigation 162. Each edge of the pre-redacted graph 164 corresponds to a link 156 established between two data objects 154 that are the subject of the investigation 162. Each presentation element 166 of the pre-redacted corresponds to a presentation element 166 that is the subject of the investigation 162.

Graph State Information

A pre-redacted graph 164 of an investigation 162 may be stored in the database 150 by the graph application 130 as "graph state information". Graph state information includes information for displaying the nodes, edges, and other presentation elements of the graph on a video display. Graph state information may include such information as two-dimensional positioning information for positioning the nodes and other presentation elements of the graph on the video display and link information indicating the nodes that are to be displayed with edges drawn there between. The graph state information may include other information such as a name of the graph and a description.

In some embodiments, graph state information for a pre-redacted graph 164 does not contain the data objects 154, links 156, and presentation elements 166 represented by the pre-redacted graph 164. Instead, the graph state information contains pointers or references to the represented data objects 154, links 156, and presentation elements 166 of the investigation subset 163. Consequently, deleting or modifying the graph state information for a pre-redacted graph 164, as an operation by itself, does not delete or modify the underlying data objects 154, links 156, and presentation elements 166 represented by the pre-redacted graph 164.

Publishing a Graph

Once a user has created a pre-redacted graph 164 representing results of the current investigation 162, the user can use the graph application 130 to publish the pre-redacted graph 164 to the graph repository 160 as a redacted graph 161 where it can be retrieved by other users into their own investigations 162 for continuing analysis.

In some embodiments, the graph publishing process begins with the publishing user specifying a set of individual users that are expected to retrieve the redacted graph 161 from the shared graph repository 160. This set of users is referred to hereinafter as the set of "target users". In some embodiments, the publishing user specifies the set of target users by entering identifiers of the target users and/or identifiers of collaboration teams through a user interface driven by the graph application 130. A collaboration team is a named collection of individual users, akin to a mailing list.

Next, the graph application 130 determines a common access control level of the set of target users. In some embodiments, the common access control level is the set of access control groups that each and every target user belongs to and the set of access control classifications that each and every target user has. In some embodiments, the common access control level is the intersection of the set of access control groups that each and every target user belongs to and the set of access control groups of the investigation authorization 165 associated with the investigation 162, and the intersection of the set of access control classifications that each and every target user has and the set of access control classifications of the investigation authorization 165 associated with the investigation 162.

In some embodiments, determining the common access control level of the set of target users involves the graph application 130 consulting the user access control level information 152 to determine, for each target user, the set of access control groups the target user belongs to and the set of access control classifications the target user has. In this case, two intersections are computed. One intersection is the intersection of the sets of access control groups for the target users (the "common access control groups of the target users"). The other intersection is the intersection of the sets of access control classifications for the target users (the "common access control classifications of the target users").

In some embodiments, the common access control level is the set of common access control groups of the target users and the set of common access control classifications of the target users. In some embodiments, common access control groups of the target users that are subordinate or subsumed by common access control groups of the target users higher in the access control level hierarchy are not included in the common access control level. Similarly, in some embodiments, common access control classifications of the target users that are subordinate or subsumed by common access control classifications of the target users higher in the access control level hierarchy are not included in the common access control level.

In some embodiments, the common access control level is (a) the intersection of the set of common access control groups of the target users (possibly omitting subordinate or subsumed groups) and the set of access control groups of the investigation authorization 165 associated with the investigation 162, and (b) the intersection of the set of common access control classifications of the target users (possibly omitting subordinate or subsumed classifications) and the set of access control classifications of the investigation authorization 165 associated with the investigation 162. By these intersections with the investigation authorization 165 associated with the investigation 162, the preview of the redacted graph presented to the publishing users does not present nodes, edges, and presentation elements that cannot be viewed by the set of target users because of the investigation authorization 165 associated with the investigation 162.

In some embodiments, instead of beginning the graph publishing process by specifying a set of individual users and/or collaboration teams that are expected to retrieve the redacted graph 161 from the shared graph repository 160, the user begins the graph publishing process instead by providing a template file that directly specifies the common access control level.

Next, whether the common access control level is determined indirectly from a set of specified users/collaboration teams or determined directly from a template file, the graph application 130 iterates over the graph components (i.e., nodes, edges, and presentation elements) of the pre-redacted graph 164 to determine, for each such graph component, whether a hypothetical user with the common access control level can view the component based on the access control information 157 associated with the data object 154, link 156, or presentation element 166 that the graph component represents. If the hypothetical user with the common access control level could not view the component, then the component will be redacted in the redacted graph 161 published to the shared graph repository 160. In particular, the pre-redacted graph 164 may be published as the redacted graph 161 based on the graph state information for the pre-redacted 164 but without graph state information for the components that were redacted.

Before publishing the pre-redacted graph 164 as the redacted graph 161 to the shared graph repository 160, the graph application 130 displays a visualization of the redacted graph 161 on the publishing user's video display so that the publishing user can view how the redacted graph 161 will be displayed to a user with the common access control level. By doing so, the publishing user can confirm, before publishing the redacted graph 161 to the shared data repository 160, that publishing the redacted graph 161 will not constitute an information leakage and at the same time will provide information useful to others' investigations 162.

Graph Sharing Methodology

FIG. 2 is a flowchart of a graph sharing methodology 200 according to some embodiments. The methodology 200 may be performed by the server computing devices that operate the graph application 130. Alternatively, the methodology 200 may be performed by a client computing device at a user site 101, in which case, the graph application 130 operates on the client computing device. As yet another alternative, the methodology 200 may be performed by a combination of a client computing device at a user site 101 and one or more server computing devices that operate the graph application 130, in which case, a portion of the graph application 130 operates on the client computing device.

For ease of understanding, the steps of the graph sharing methodology 200 are depicted and described as being performed in a certain order. However, it will be understood by those skilled in the art that where a step is not dependent on results of another step or steps, that step may be performed in a different order or performed concurrently with respect to other steps.

At block 201, the graph application 130 stores, in database 150, first graph state information representing a pre-redacted graph 164 having nodes, edges, and presentation elements 166. The pre-redacted graph 164 represents result of a first user's investigation involving data objects 154, properties 155, links 156, and presentation elements 166 that are the subject of the first user's investigation 162. The first graph state information points to or references the data objects 154, links 156, and presentation elements 166 in the first user's investigation subset 163.

In some embodiments, the first graph state information has information representing the nodes, edges, and presentation elements of the pre-redacted graph 164 including information for displaying the nodes, edges, and presentation elements in a visible graph arrangement on a video display. For each node of the pre-redacted graph 164, there is information in the first graph state information that points to or references the data object 154 in the first user's investigation subset 163 that is represented by the node. In addition, for each edge of the pre-redacted graph 164, there is information in the first graph state information that points to or references the link 156 in the first user's investigation subset 163 that is represented by the edge. In addition, for each presentation element of the pre-redacted graph 164, there is information in the first graph state information that points to or references the presentation element 166 in the first user's investigation subset 163.

In some embodiments, the pre-redacted graph 164 may contain components other than just nodes and edges. These other non-edge and non-node components may include textual notes, property boxes, audio content, video content, audio/video content, documents, or other presentable information. The first graph state information may contain positioning information specifying where on the visible graph the non-edge and non-node components are to be displayed in relation to the node and edge components of the pre-redacted graph 164. Further, the first graph state information may contain information for each non-edge and non-node component that points to or references the database information (e.g., the text note, the property box, the audio content, the video content, the audio/video content, the document, or other presentable information) in the first user's investigation subset 163 represented by the non-edge and non-node component. Information in the first user's investigation subset 163 represented by a non-edge and non-node component of the pre-redacted graph 164 may be associated, in the first user's investigation subset 163, with access control information 157 for controlling access to the database information.

At block 202, the graph application 130 obtains user identification information identifying a set of one or more target users that the first user expects to share the pre-redacted graph 164 with. The user identification information may include a list of one or more individual user identifiers and/or a list of one or more collaboration team identifiers. User identification information may be obtained by the graph application 130 directly from the first user. Alternatively, user identification information may be obtained from the database 150 based on information obtained directly from the first user.

At block 203, the graph application 130 determines, based on the user identification information obtained at block 202, user access control level information identifying a set of one or more access control levels common to the one or more target users that the first user expects to share the pre-redacted graph 164 with. To do so, the graph application 130 may use the user identification information to obtain, from the user access control level information 152 in the database 150, for each target user, the set of access control groups that the target user belongs to and the set of access control classifications that the target user has. From this access control level information obtained for each target user, the graph application 130 determines a common access control level for the set of target users.

At block 204, the graph application 130 generates, based on the user access control level information determined at block 203 and the first graph state information stored at block 201, second graph state information representing a redacted graph having one or more nodes, edges, or non-edge and non-node components of the pre-redacted graph 164 redacted. Generally, this involves the graph application 130 creating a copy of the first graph state information with information representing the redacted nodes, edges, and non-edge and non-node components removed in the second graph state information. To determine which nodes, edges, and non-edge and non-node components of the pre-redacted graph 164 to redact, the graph application 130 iterates over the nodes, edges, and non-edge and non-node components of the pre-redacted graph 164 comparing the version of the access control information 157 associated with the database information represented by the node, edge, or non-edge and non-node component stored in the first user's investigation subset 163 with the common access control level determined for the set of target users. In some embodiments, if the common access control level gives permission to view the database information represented by a node, edge, or non-edge and non-node component, then information representing the node, edge, or non-edge and non-node component in the first graph state information is retained in the second graph state information.

In some embodiments, to view a data object 154, a link 156, or other database information represented by a non-edge and non-node component, the common access control level must include all classifications required by the access control list 158 associated with the data object 154, the link 156, or the other database information, and must have at least the discover permission, according to the access control group information of the associated access control list 158 and the access control groups of the common access control level. Other requirements for viewing are possible and embodiments are not limited to any particular set of requirements. For example, a user with the common access control may be required to have the read permission instead of just the discover permission.

In some embodiments, a node of the pre-redacted graph 164 corresponding to a data object 154 in the first user's investigation subset 163 is not redacted from the pre-redacted graph 164 so long as at least one data property 155 of the data object 154 is viewable according to the common access control level.

In some embodiments, a pre-redacted graph 164 may include a group node which represents a set of two or more data objects 154 in the first user's investigation subset 163. In some embodiments, a group node of the pre-redacted graph 164 corresponding to data objects 154 in the first user's investigation subset 163 is not redacted from the pre-redacted graph 164 so long as at least one of the data objects 154 of the group is viewable to the common access control level. View-ability of a data object 154 of the group may be determined based on the properties 155 of the data object 154 as discussed in the previous paragraph.

In some embodiments, an edge of the pre-redacted graph 164 corresponding to a link 156 in the first user's investigation subset 163 is redacted if not viewable to the common access control level.

In some embodiments, an edge of the pre-redacted graph 164 is also redacted if the common access control level cannot view both data objects 154 that the corresponding link 156 connects even if the common access control level has permission to view the corresponding link 156. View-ability of a data object 154 connected by a link 156 may be determined based on the properties 155 of the data object 154 as discussed in a previous paragraph above.

In some embodiments, an edge of the pre-redacted graph 164 corresponds to more than one link 156 in the first user's investigation subset 163. In this case, the edge may not be redacted so long as at least one of the links 156 is viewable by the common access control level. However, the edge may be redacted even if one of the links 156 is viewable by the common access control level when both data objects 154 that the links 156 connect are not viewable by the common access control level.

At block 205, the graph application 130 presents a visualization of the second graph state information to the first user on the first user's video display. This visualization may be a graph representation of the pre-redacted graph 164 but with the nodes and edges redacted at block 204 not displayed.

At block 206, the graph application 130 publishes the second graph state information representing a redacted graph 161 to the shared graph repository 160 in response to a command provided by the first user through user interface controls presented on the first user's video display. Once published, other users of the graph application 130 can bring the redacted graph 161 into their own investigations 162 for continuing analysis.

In some embodiments, publication of the second graph state information to the shared graph repository 160 coincides with publication of the investigation subset 163 back to the shared data repository 153. In some embodiments, if there are data change conflicts between the versions of the data objects 154 and links 156 in the investigation subset 163 and the versions of the those data objects 154 and links 156 in shared data repository 153 at the time of publication, the data change conflicts must be resolved in the investigation subset 163, either manually or automatically, before the second graph state information is published to the shared graph repository 160. Such data changes conflicts include any conflicts between access control information 157 associated with those data objects 154 and links 156 in the investigation subset 163 and access control information 157 associated those data objects 154 and links 156 in the shared data repository 153. In the case of data change conflicts, after the data change conflicts have been resolved, the methodology 200 may return to block 204 to generate new second graph state information based on the updated investigation subset 163 containing the results of the conflict resolutions.

Example Graph Sharing User Interfaces

Figure 3A:
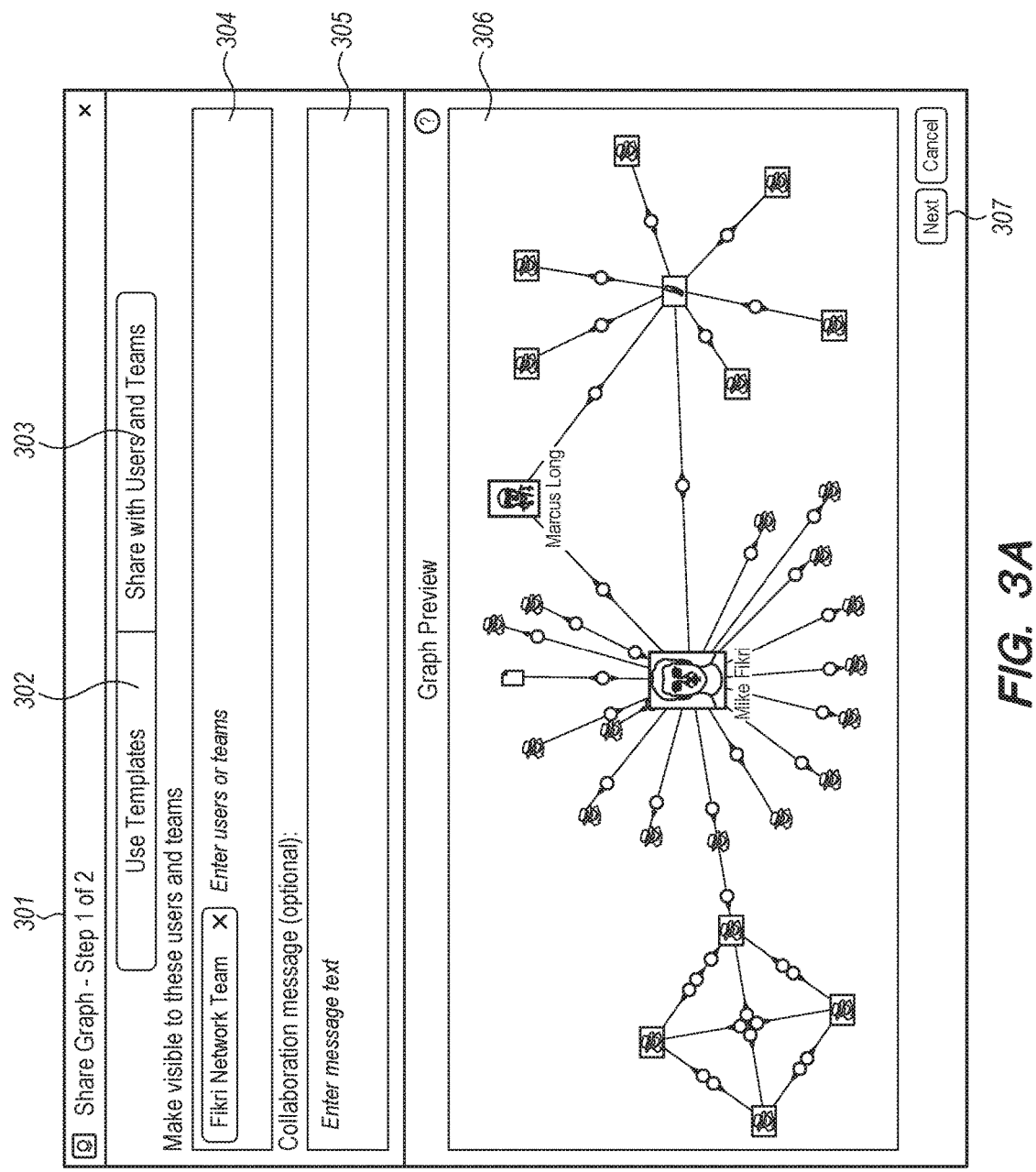
FIGS. 3A-D are examples of graph sharing user interface dialogs for publishing a redacted graph to a shared graph repository of the investigative analysis system.
Figure 3B:
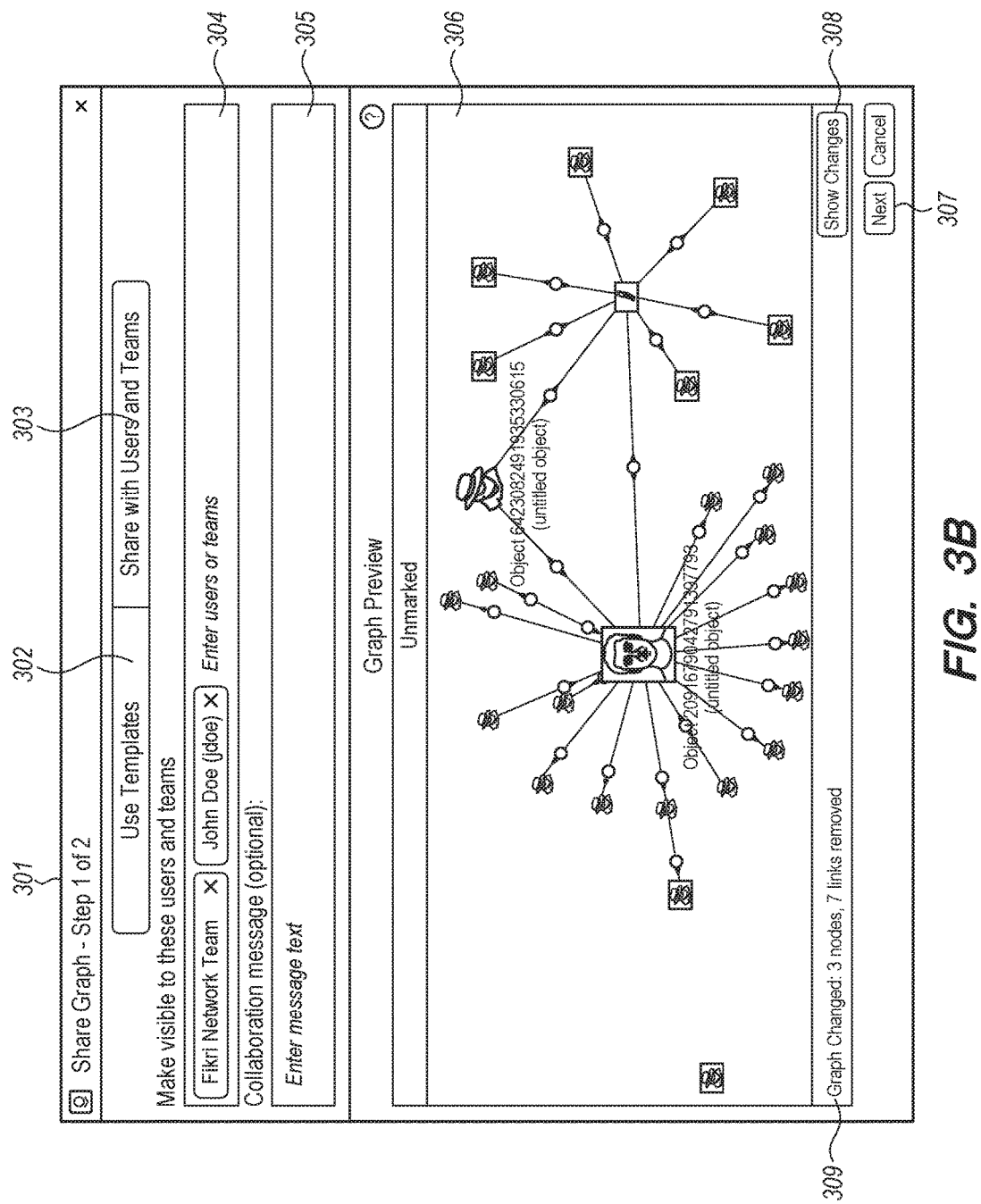
Figure 3C:
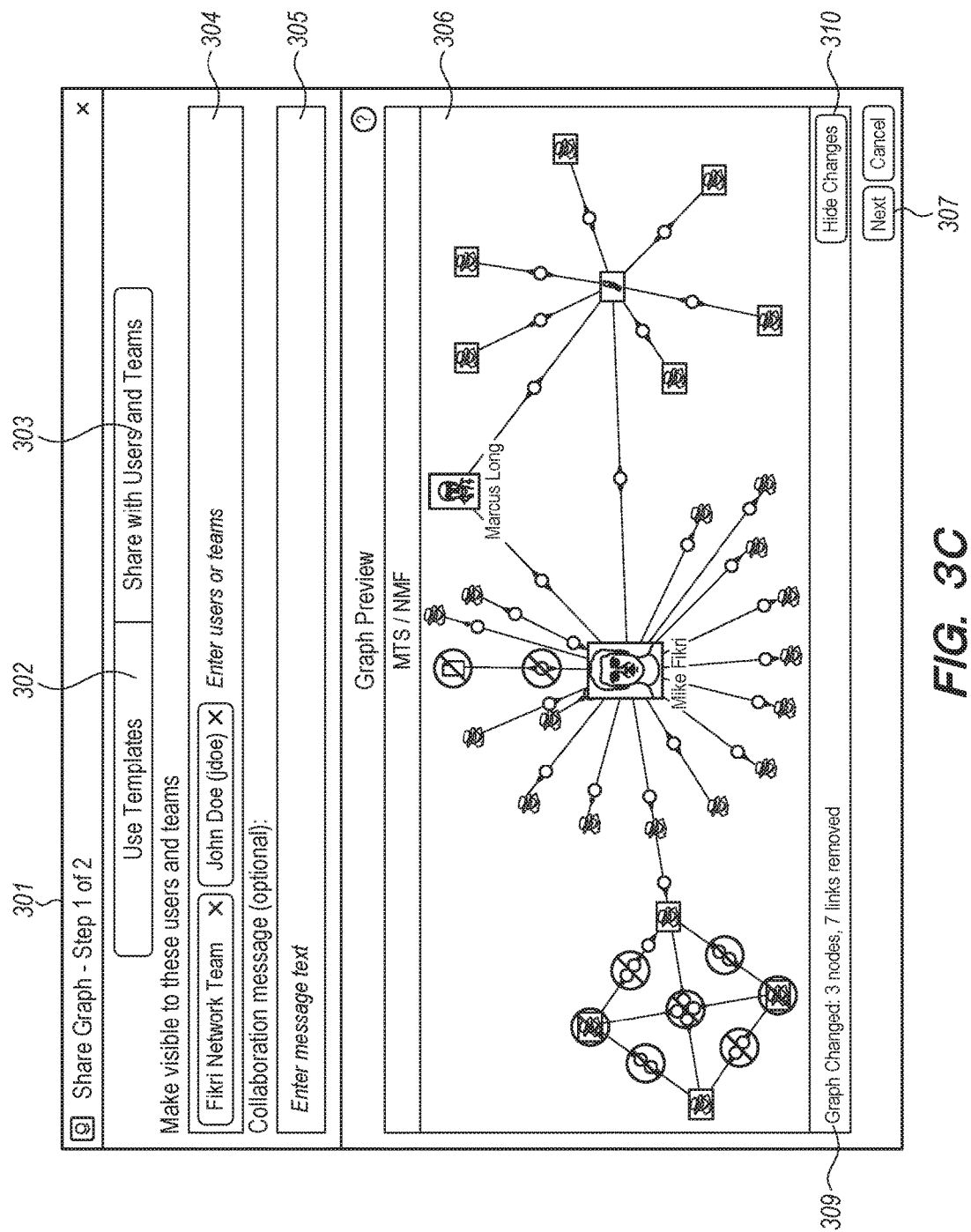

FIG. 3A, FIG. 3B, FIG. 3C are exemplary graph sharing user interfaces that may be driven by the graph application 130 for sharing a pre-redacted graph 164 of an investigation 162 with other graph application 130 users according to an embodiment. The user interfaces of FIGS. 3A-C may be presented on a video display at a user site 101 operatively coupled to the graph application 130.

In FIG. 3A, there is shown a graphical user interface dialog 301 displaying, in the graph preview pane 306, a selected pre-redacted graph 164 to be shared. The dialog 301 includes a "use templates" button 302 which, when selected, allows the user to specify a template file containing a list of users and/or collaboration teams representing the users that the pre-redacted graph 164 is to be shared with. In addition to or instead of a list of users and/or collaboration teams, the template can specify a set of access control groups and/or classifications, as described above. Alternatively, the user can specify the individual users and collaboration teams in the entry panel 304 when the "share with users and teams" button 303 is selected. The dialog 301 also includes a message field 305 for entering optional collaboration message information.

As shown in FIG. 3B, in an embodiment, as the user enters individual users and/or collaboration teams in the entry panel 304, the graph application 130 automatically redacts nodes and edges of the pre-redacted graph 164 that are not visible to all users specified in the entry area 304. In the example of FIG. 3B, as indicated in the graph redaction status panel 309, the collaboration team ("Fikri Network Team") and the individual user ("John Doe") entered into the entry panel 304 causes three nodes and seven edges to be redacted from the pre-redacted graph 164 shown in FIG. 3A. In FIG. 3B, the redacted graph displayed in the preview area 306 removes display of the redacted nodes and edges. Alternatively, as in FIG. 3C, the redacted graph is displayed with the redacted nodes edges visible but with redaction indicators. In the current example, the redaction indicators are circles with a diagonally orientated intersects that overlay the redacted nodes and edges. However, other redaction indicators are possible and embodiments are not limited to the indicators shown in FIG. 3C. In general, any visual indication that visually distinguishes a redacted node or edge from a non-redacted node or edge may be used. The user can operate the "show changes" button 308 and the "hide changes" button 310 to toggle between the two preview displays.

Figure 3D:
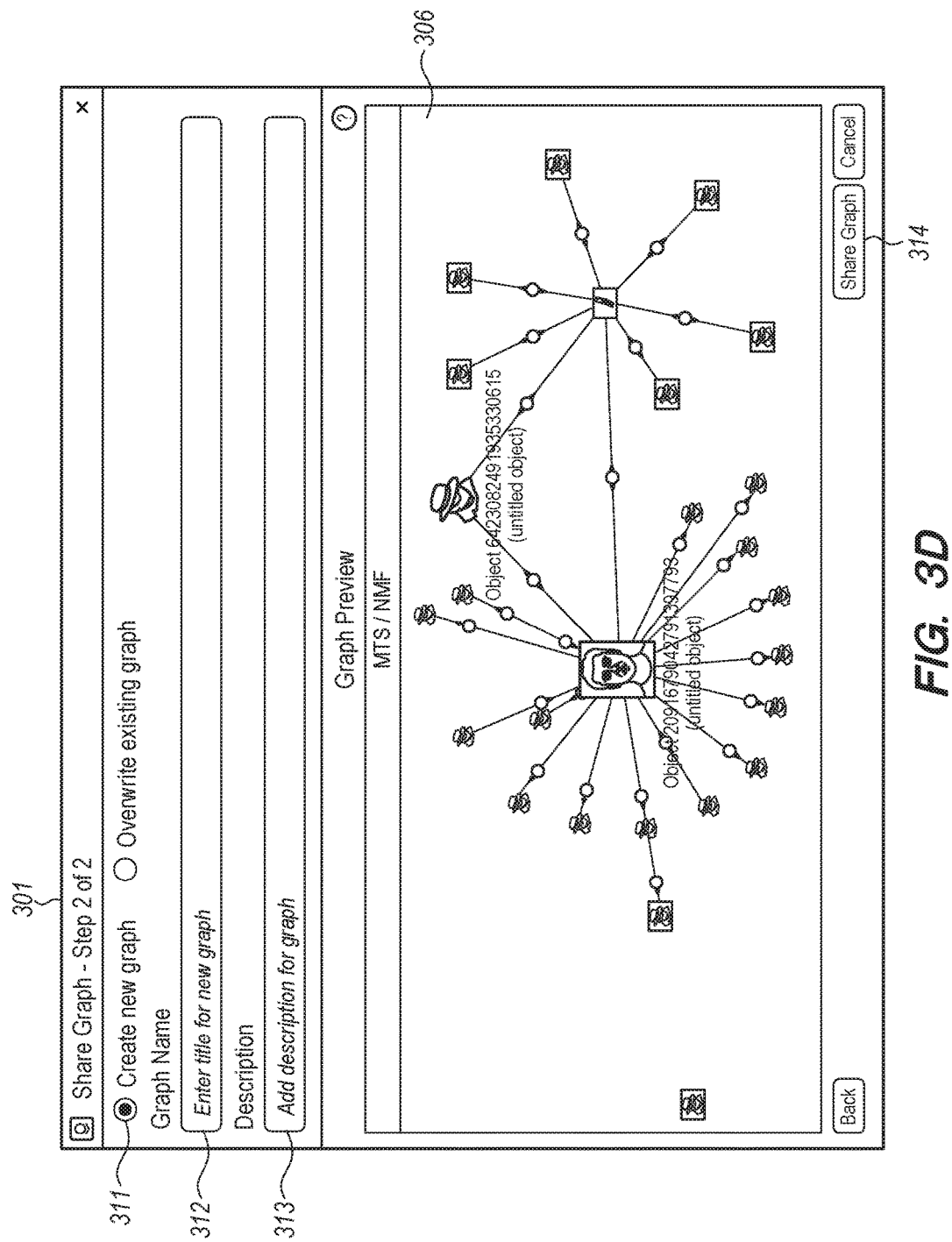

Once the user has finished entering users and/or collaboration teams into the entry panel 304 or provided a template and the user is satisfied with the redacted version of the graph displayed in the graph preview area 306, the user may select the "next" button 307 to reveal the dialog 301 shown in FIG. 3D. Here, the user may operate one of the radio buttons 311 to publish the redacted graph previewed in the preview area 306 to the shared graph repository 160 as a new redacted graph or to replace an existing redacted graph in the shared graph repository 160. If the "overwrite existing graph" radio button 311 is selected, the dialog 301 may present user interface controls for selecting and/or searching for the redacted graph in the shared graph repository 160 to overwrite. If the "create new graph" radio button 311 is selected, the user may provide a name for the new graph in the text entry area 312 and a description of the new graph in the text entry area 313. When finished, the user may operate the "share graph" button 314 to publish graph state information representing the redacted graph previewed in the preview area 306 to the shared graph repository 160.

Figure 4:
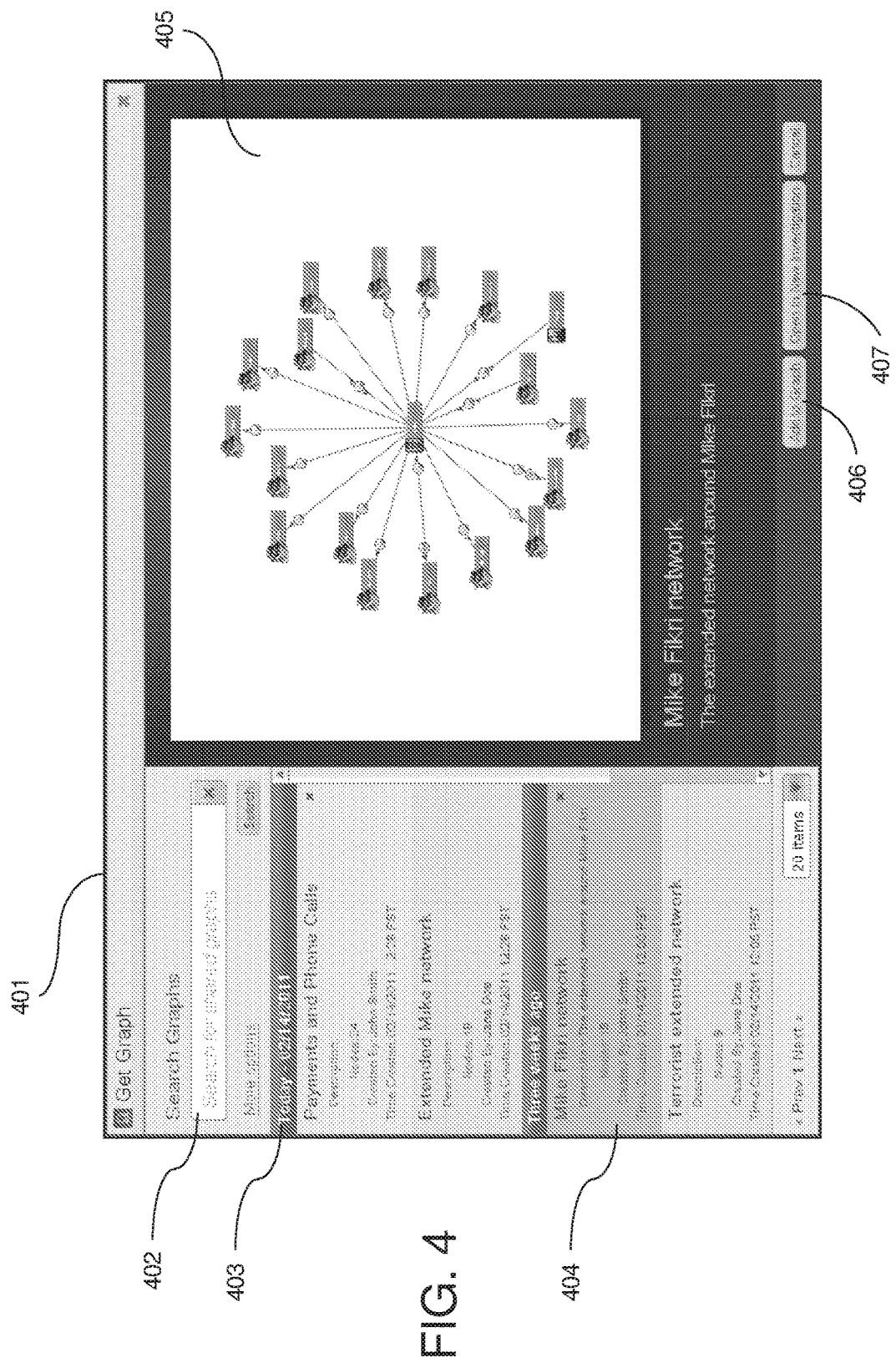
FIG. 4 is an example of a graph sharing user interface dialog for getting a redacted graph from the shared graph repository of the investigative analysis system.

FIG. 4 includes an exemplary user interface that may be presented on a video display to a user at a user site 101 for retrieving a previously published redacted graph 161 in the shared graph repository 160 into the user's investigation 162 as a pre-redacted graph 164. The user interface may be driven by the graph application 130 and includes a user interface dialog 401. The dialog 401 allows the user to choose a published redacted graph 161 from a list 403 of published redacted graphs 161 available to the user stored in the shared graph repository 160. In the published redacted graphs list 403, the user can select a list item 404 to preview the corresponding redacted graph 161 in the graph preview area 405. When the user has selected a list item 404 corresponding to the published redacted graph 161 of interest to the user, the user can operate the "add to graph" button 406 to bring the published redacted graph 161 into the user's current investigation 162 as a pre-redacted graph 164. Alternatively, the user can operate the "open in new investigation" button 407 to create a new investigation 162 and bring the published redacted graph 161 into the new investigation 161 as a pre-redacted graph 164.

Sample Computer System

Figure 5:
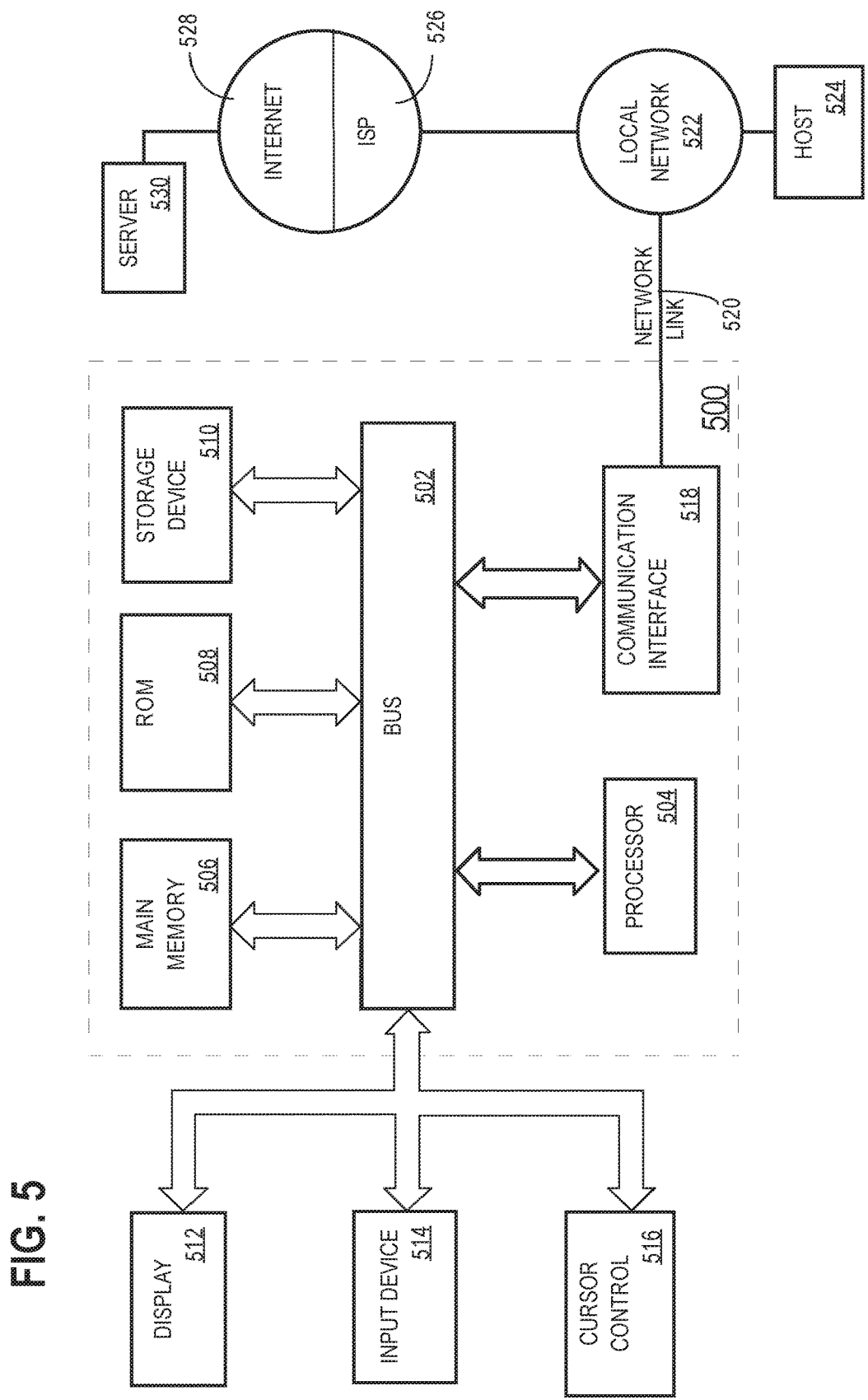
FIG. 5 is a block diagram of a sample computer system on which embodiments of the present invention may be implemented.

FIG. 5 is a block diagram that illustrates a computer system 500 upon which embodiments of the present invention may be implemented. Computer system 500 includes a bus 502 or other communication mechanism for communicating information, and one or more hardware processors 504 coupled with bus 502 for processing information. A hardware processor 504 may be, for example, a general purpose microprocessor.

Computer system 500 also includes a main memory 506, such as a random access memory (RAM) or other dynamic storage device, coupled to bus 502 for storing information and instructions to be executed by processor(s) 504. Main memory 506 also may be used for storing temporary variables or other intermediate information during execution of instructions to be executed by processor(s) 504. Such instructions, when stored in non-transitory media accessible to processor(s) 504, render computer system 500 into a special-purpose computing device that is customized to perform the operations specified in the instructions. For purposes of this description, main memory 506 includes any non-volatile memory used to implement virtual memory.

Computer system 500 may further include a read only memory (ROM) 508 or other static storage device coupled to bus 502 for storing static information and instructions for processor(s) 504. One or more storage device(s) 510, such as magnetic disks, optical disks, or solid-state drives, may be provided and coupled to bus 502 for storing information and instructions.

Computer system 500 may be coupled via bus 502 to a display 512, such as a liquid crystal display (LCD), for displaying information to a computer user. One or more input device(s) 514, including alphanumeric and other keys, a touch panel, physical buttons, a mouse, a trackball, a cursor control device, or other input device may be coupled to bus 502 for communicating information and command selections to processor(s) 504. Where an input device 514 is a touch panel, the touch panel may be physically integrated with the display 512, for example as a resistive or capacitive sensing touch panel overlay on an LCD screen, for detecting the presence and location of touch within the display 512 area.

Computer system 500 may implement the techniques described herein using customized hard-wired logic, one or more ASICs or FPGAs, firmware and/or program logic which in combination with the computer system causes or programs computer system 500 to be a special-purpose machine. The techniques herein may be performed by computer system 500 in response to processor(s) 504 executing one or more sequences of one or more instructions contained in main memory 506. Such instructions may be read into main memory 506 from another storage medium, such as storage device(s) 510. Execution of the sequences of instructions contained in main memory 506 causes processor(s) 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device(s) 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid-state drive of a remote computer. The remote computer can load the instructions into its dynamic memory and send the instructions over wired (e.g., twisted pair, coaxial cable, optical fiber, etc.) or wireless (e.g., microwave, satellite, cellular, radio, etc.) networks. A network communications device local to computer system 500 can receive the data on the network and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the instructions. The instructions received by main memory 506 may optionally be stored on storage device(s) 510 either before or after execution by processor(s) 504.

Computer system 500 also includes one or more communication interface(s) 518 coupled to bus 502. Communication interface(s) 518 sends and receives electrical, electromagnetic or optical signals that carry digital data streams representing various types of information. Communication interface(s) 518 provides a two-way data communication coupling to a network link 520 that is connected to a wired or wireless local network 522. For example, communication interface(s) 518 may include a modem, an integrated services digital network (ISDN) card, an Ethernet card, a cable modem, a satellite modem, an IEEE 802.11 or other Wireless Local Area Network (WLAN) interface, a 3G, 4G, or other cellular network interface, or other network interface for communicating on wired or wireless local network 522.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program instructions, through the network(s), network link 520 and communication interface(s) 518. In the Internet example, a server 530 might transmit a requested instructions for an application program through Internet 528, ISP 526, local network 522 and communication interface(s) 518.

The received instructions may be executed by processor(s) 504 as it is received, and/or stored in storage device(s) 510, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method, comprising:
   selecting a subset of data objects from a base copy for use with a first investigation;
   creating a first instance of graph state information based on the subset of data objects included in the base copy and including a graph having nodes representing the subset of data objects and edges representing relationships between the subset of data objects;
   causing, based on the first instance of graph state information, a visualization of the first instance of graph state information in association with the first investigation;
   receiving first input to modify information associated with at least one data object of the subset of data objects;

receiving information that identifies a set of targets that are allowed to assist in the first investigation, and in response, determining a common access control level for the set of targets;

automatically creating a second instance of graph state information based on the first instance of the graph state information and based on the common access control level for the set of targets;

before allowing the set of targets to access the second instance of graph state information, causing a visualization of the second instance of graph state information;

receiving an acceptance of the visualization of the second instance of graph state information, and in response, publishing the second instance of graph state information to a graph repository and then allowing the set of targets access to the published second instance of graph state information.

2. The method of claim 1, further comprising:

receiving a second request associated with the set of targets to retrieve the published second instance of graph state information from the graph repository;

causing, based on the second instance of graph state information, a visualization of the second instance of graph state information to be displayed on a video display of a second investigation;

after causing generation of the visualization of the first instance of graph state information, receiving a second input to modify information associated with another of the subset of data objects to create a third instance of graph state information based, at least in part, on the second instance of graph state information;

publishing the third instance of graph state information to the graph repository.

3. The method of claim 2, further comprising:

receiving a request to retrieve the published third instance of graph state information from the graph repository;

causing, based on the third instance of graph state information, a visualization of the third instance of graph state information to be displayed on the video display of the first investigation.

4. The method of claim 1, wherein the published second instance of graph state information comprises redacted second instance of graph state information, and the redacted second instance of graph state is based at least in part on whether one of the targets is allowed access to information on the subset of data objects represented in the second instance of graph state information.

5. The method of claim 4, wherein the visualization of the second instance of graph state information comprises the redacted second instance of graph state information.

6. The method of claim 4, wherein the second instance of graph state information comprises a particular data object of the subset of data objects, the particular data object having one or more data properties; and the method further comprises removing the particular data object from the second instance of graph state information to create the published second instance of graph state information based on a second target or investigation not having permission to view any data property of the one or more data properties of the particular data object.

7. The method of claim 4, wherein the second instance of graph state information comprises a particular data object of the subset of data objects; and the method further comprises removing the particular data object from the second instance of graph state information to create the published second instance of graph state information based on a second target or investigation not having permission to view the particular data object.

8. The method of claim 4, wherein the second instance of graph state information comprises two related data objects connected by a particular edge; and the method further comprises removing the particular edge from the second instance of graph state information to create the published second instance of graph state information based on a second target or investigation not having permission to view the particular edge.

9. The method of claim 1, wherein the second instance of graph state information comprises one or more presentation elements; and wherein each of the presentation elements of the one or more presentation elements is of a presentation element type selected from the group consisting of a text note, digital audio content, digital video content, digital audio/video content, or a document.

10. The method of claim 1, wherein each data object of the subset of data objects represent at least one of an entity, a place, an organization, an event, or a document.

11. The method of claim 1, wherein each data object of the subset of data objects is structured using a pre-defined ontology to hierarchically structure information associated with said each data object.

12. The method of claim 1, wherein the information that identifies the set of targets comprises a pre-defined group identifier that specifies the set of targets.

13. The method of claim 1, wherein changes based on the first input to modify information associated with at least one data object of the subset of data objects are made separately from data objects stored at the base copy.

14. A computer system, comprising one or more processors and one or more non-transitory data storage media coupled to the one or more processors and storing sequences of instructions which when executed by the one or more processors cause performing:

selecting a subset of data objects from a base copy for use with a first investigation;

creating a first instance of graph state information based on the subset of data objects included in the base copy and including a graph having nodes representing the subset of data objects and edges representing relationships between the subset of data objects;

causing, based on the first instance of graph state information, a visualization of the first instance of graph state information in association with the first investigation;

receiving first input to modify information associated with at least one data object of the subset of data objects;

receiving information that identifies a set of targets that are allowed to assist in the first investigation, and in response, determining a common access control level for the set of targets;

automatically creating a second instance of graph state information based on the first instance of the graph state information and based on the common access control level for the set of targets;

before allowing the set of targets to access the second instance of graph state information, causing a visualization of the second instance of graph state information;

receiving an acceptance of the visualization of the second instance of graph state information, and in response, publishing the second instance of graph state information to a graph repository and then allowing the set of targets access to the published second instance of graph state information.

15. The computer system of claim 14, wherein the instructions further comprise:
receiving from a second target or investigation included in the set of targets, a request to retrieve the published second instance of graph state information from the graph repository;
causing, based on the second instance of graph state information, a visualization of the second instance of graph state information to be displayed on a video display for the second target or investigation;
after causing generation of the visualization of the first instance of graph state information, receiving a second input to modify information associated with another at least one data object of the subset of data objects to create a third instance of graph state information based, at least in part, on the second instance of graph state information;
publishing the third instance of graph state information to the graph repository.

16. The computer system of claim 14, wherein the instructions further comprise:
receiving a request to retrieve the published third instance of graph state information from the graph repository;
causing, based on the third instance of graph state information, a visualization of the third instance of graph state information to be displayed on the video display of the first investigation.

17. The computer system of claim 14, wherein the published second instance of graph state information comprises redacted second instance of graph state information, and the redacted second instance of graph state is based at least in part on whether one of the targets is allowed access to information on the subset of data objects represented in the second instance of graph state information.

18. The computer system of claim 14, wherein the visualization of the second instance of graph state information comprises the redacted second instance of graph state information.

19. The computer system of claim 18, wherein the second instance of graph state information comprises a particular data object of the subset of data objects, the particular data object having one or more data properties; and the method further comprises removing the particular data object from the second instance of graph state information to create the published second instance of graph state information based on a second target or investigation not having permission to view any data property of the one or more data properties of the particular data object.

20. The computer system of claim 18, wherein the second instance of graph state information comprises a particular data object of the subset of data objects; and the method further comprises removing the particular data object from the second instance of graph state information to create the published second instance of graph state information based on a second target or investigation not having permission to view the particular data object.

\* \* \* \* \*